Figure 1:
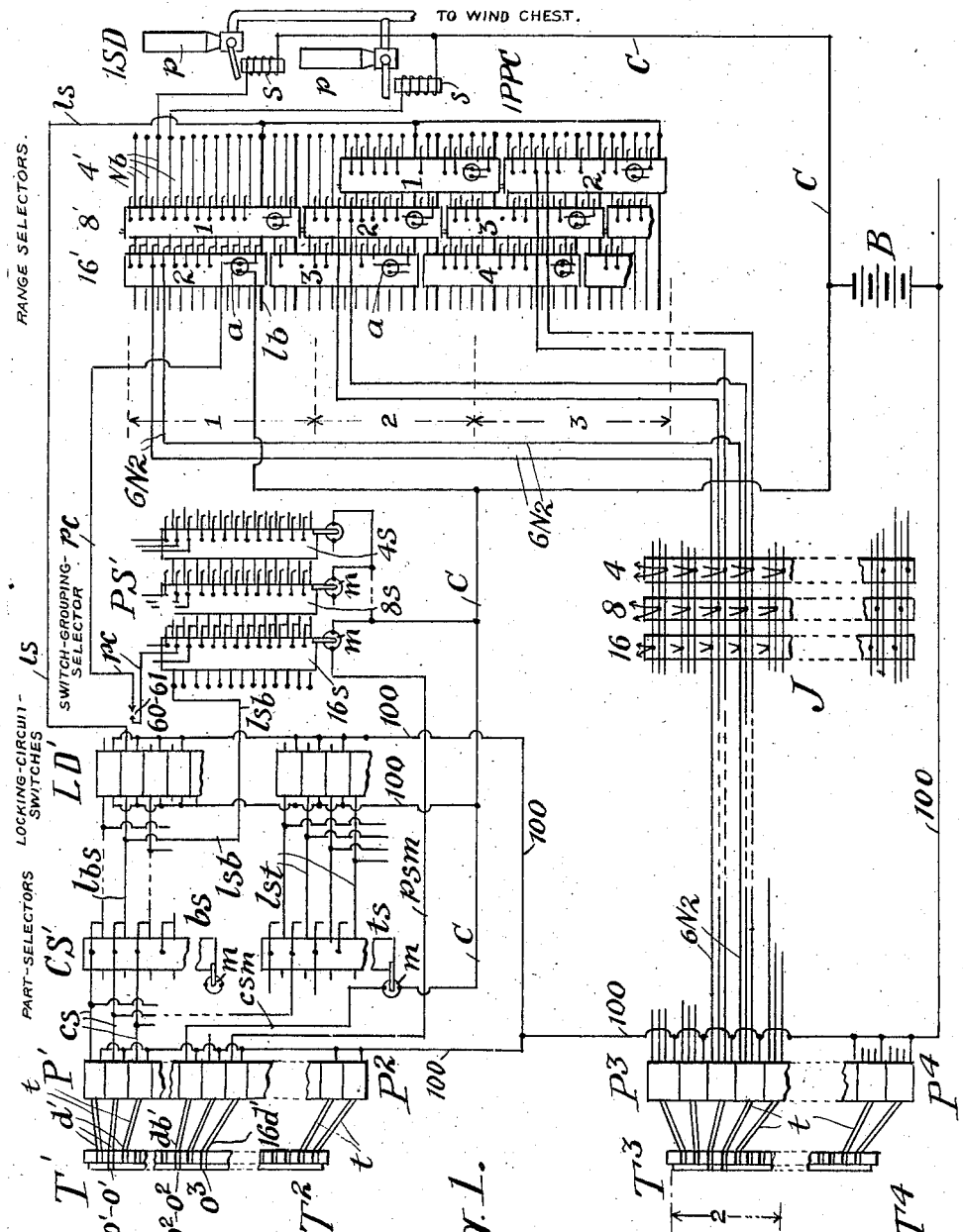

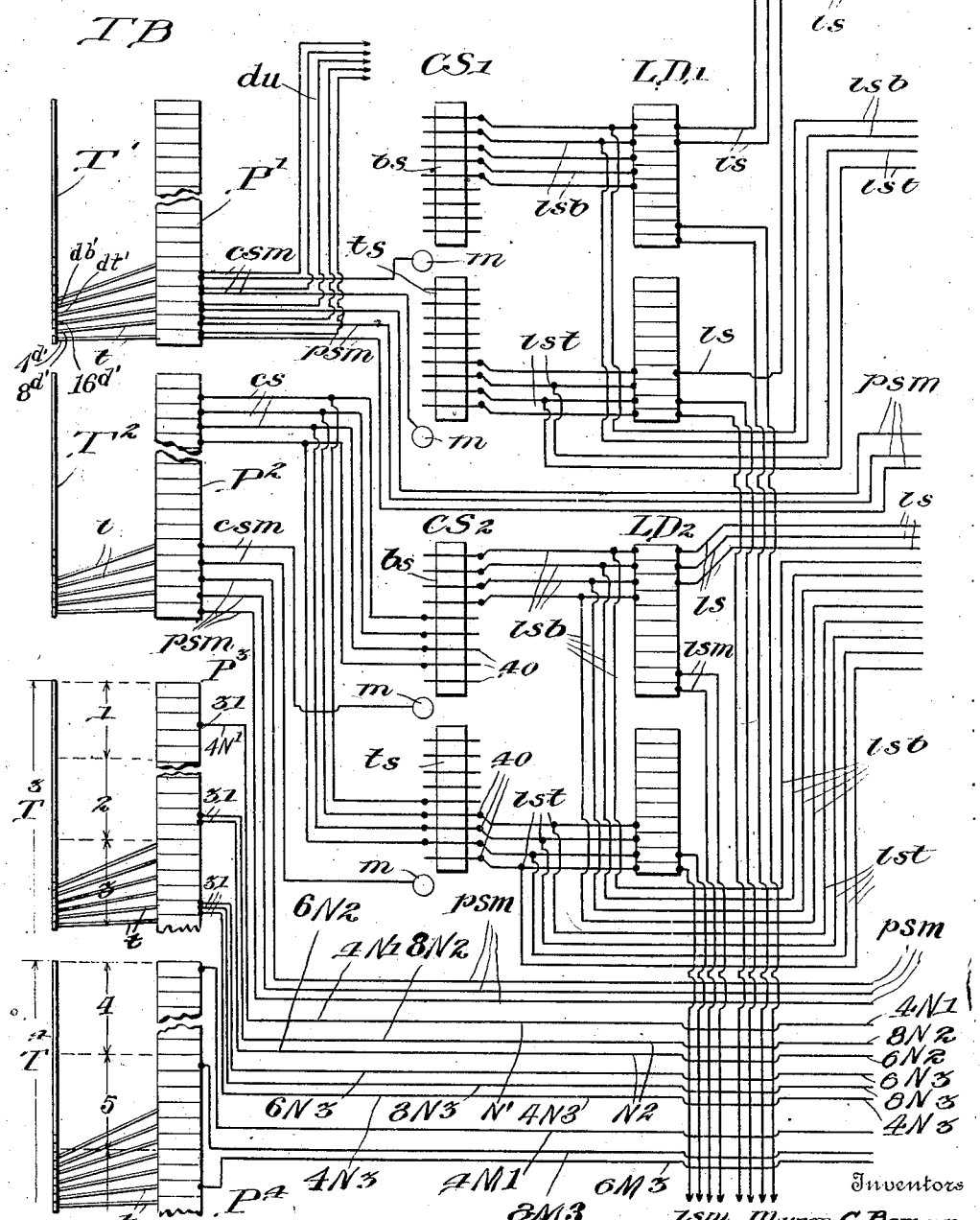

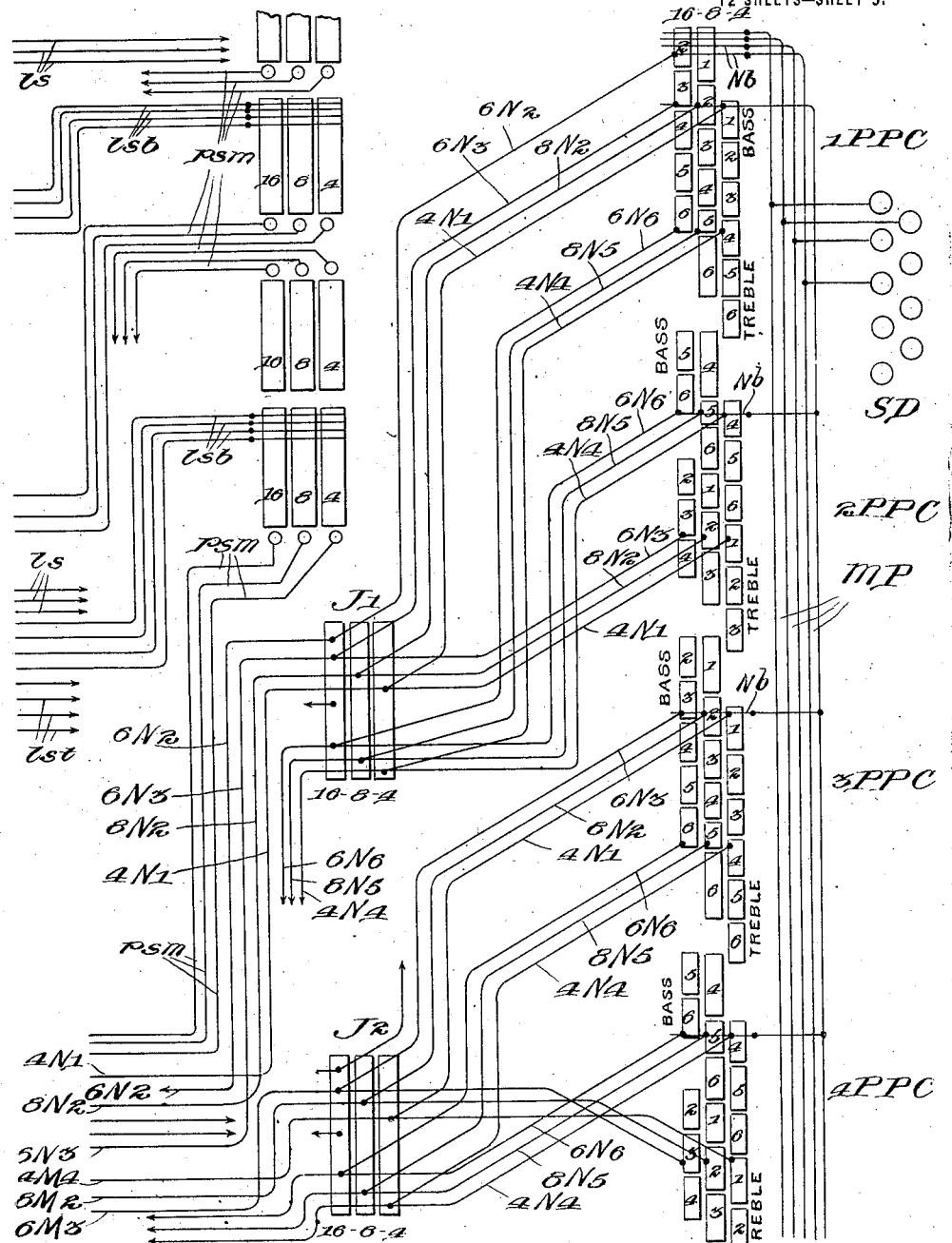

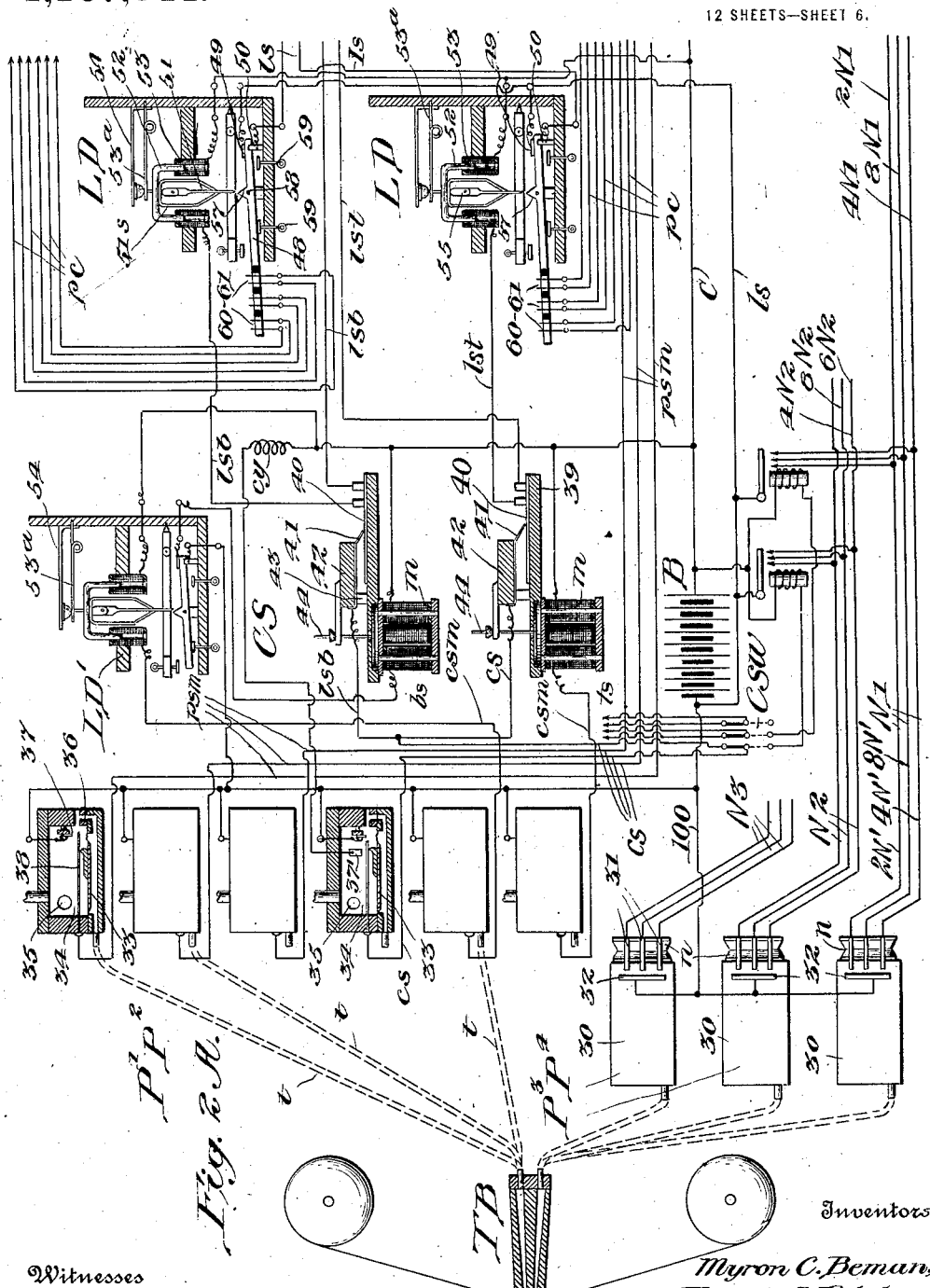

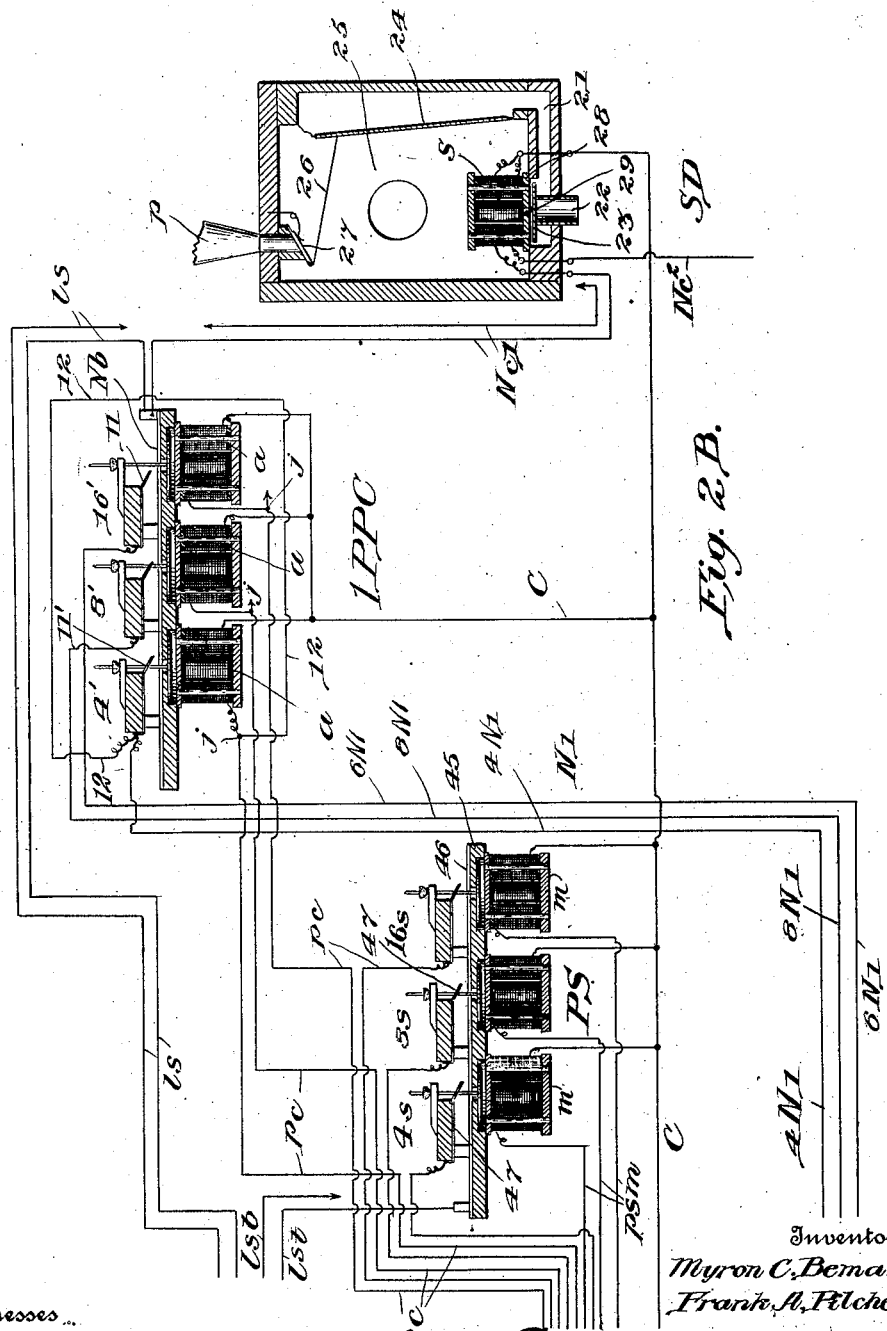

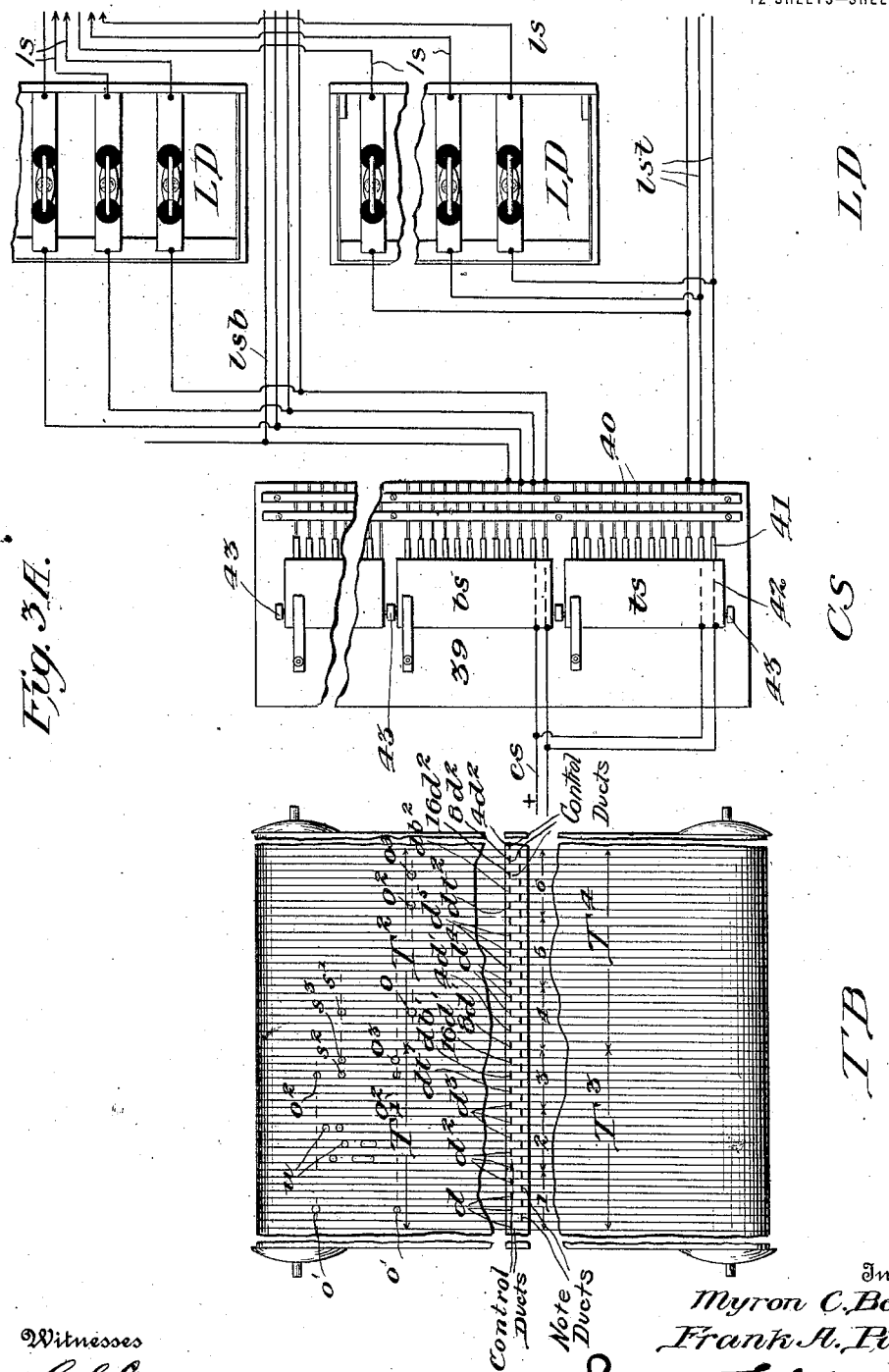

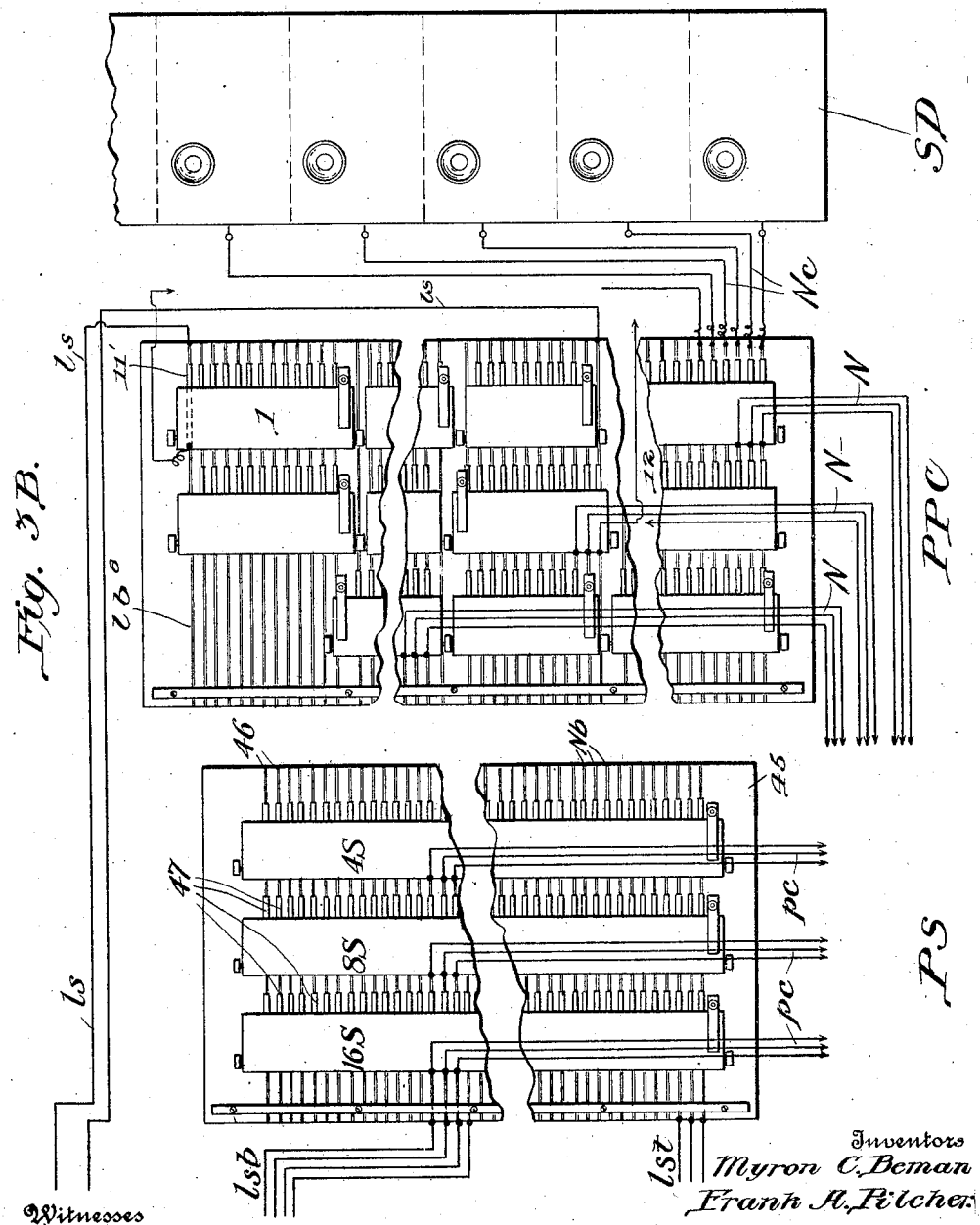

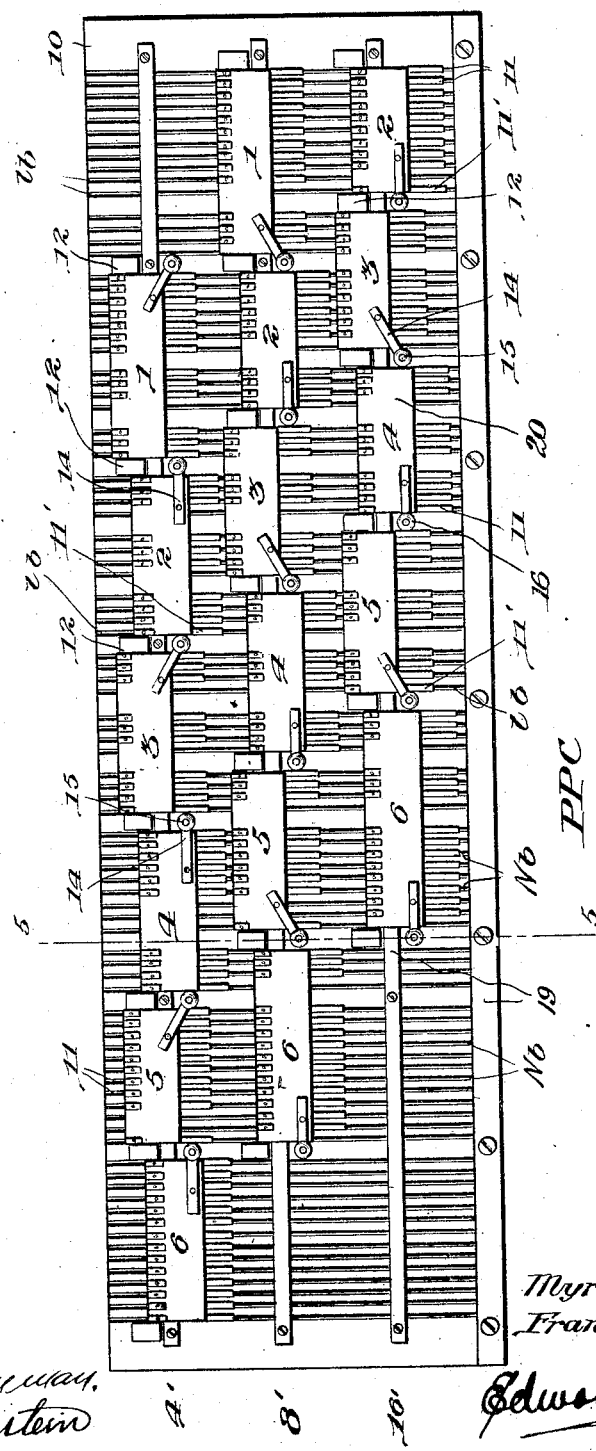

M. C. BEMAN & F. A. PILCHER.
AUTOMATIC ORGAN.
APPLICATION FILED APR. 16, 1913.
1,167,344.
Patented Jan. 4, 1916.
12 SHEETS—SHEET 11.
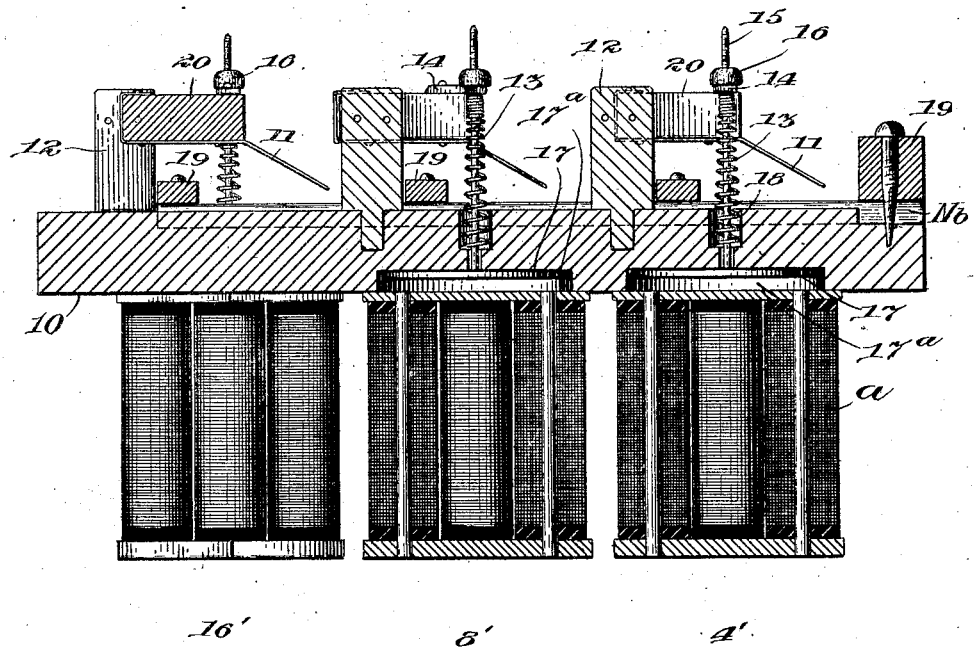
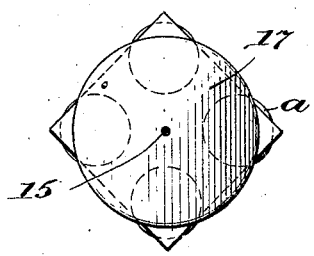

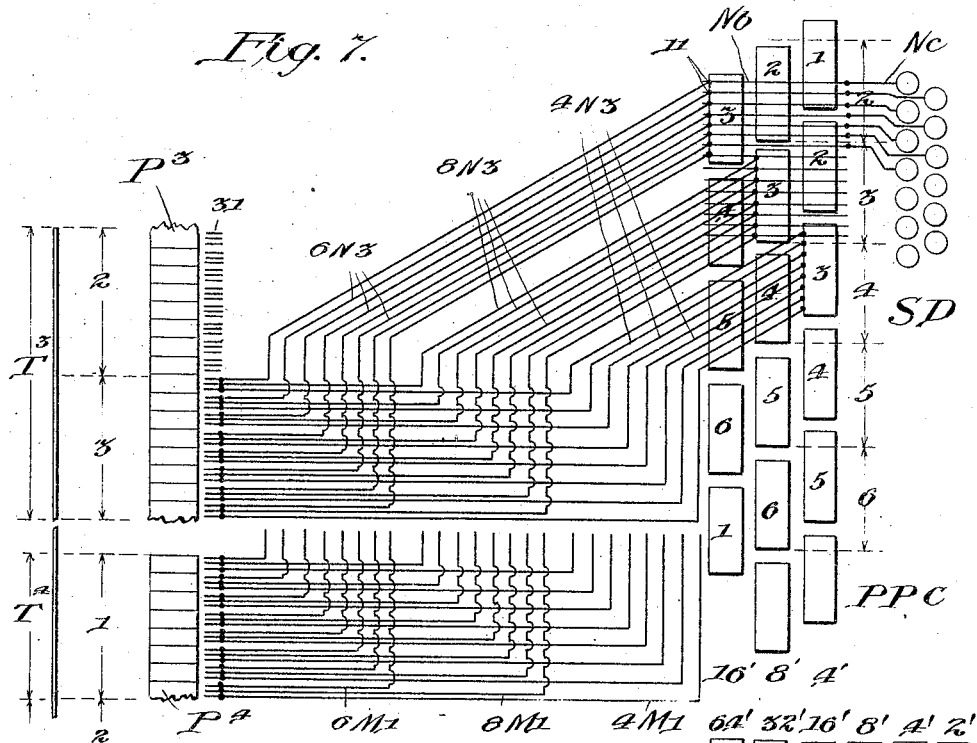
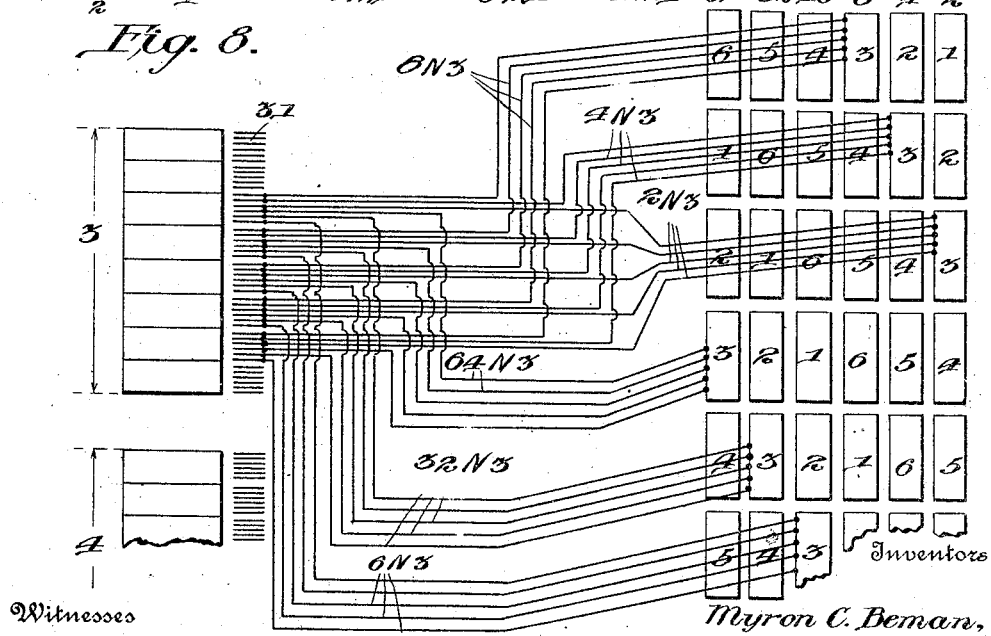

UNITED STATES PATENT OFFICE.

MYRON C. BEMAN AND FRANK A. PILCHER, OF BINGHAMTON, NEW YORK, ASSIGNORS TO BEMAN SYMPHONIE ORGAN COMPANY, OF BINGHAMTON, NEW YORK, A CORPORATION OF NEW YORK.

AUTOMATIC ORGAN.

1,167,344.      Specification of Letters Patent.      Patented Jan. 4, 1916.

Application filed April 16, 1913. Serial No. 761,642.

*To all whom it may concern:*

Be it known that we, MYRON C. BEMAN and FRANK A. PILCHER, citizens of the United States, residing at Binghamton, in the county of Broome and State of New York, have invented certain new and useful Improvements in Automatic Organs, of which the following is a specification, reference being had therein to the accompanying drawing.

Our invention relates to apparatus for playing automatic musical instruments of the pipe organ type.

The difficulty in producing orchestral music from an automatic instrument of the above described type has been that the control of the instrument had to be accomplished through the use of a multiple number of tracker-bars and a corresponding number of records or the equivalent, or else the scope of rendition of the instrument was narrowly limited. In most instances it has been possible only to secure the rendition of a single solo part and one or two accompaniment parts, but occasionally it has been found possible to play simple orchestral music in which the number of parts is small. This limitation has been due combinedly to the great complication incident to the use of a plurality of tracker bars and records and to the complication of the old pneumatic actions.

According to our invention it is possible to play orchestral music in which there are represented over thirty different instruments and a corresponding number of parts, from a single tracker-bar having perforations less in number than the number of sounding devices, together with a single co-operating record roll or music sheet. Furthermore apparatus may readily be constructed, to further carry out our invention, by which the number of different instruments and parts represented may be increased to forty or even fifty. In short the scope of rendition of an instrument operating according to our invention is far more than sufficient for the playing of any orchestral music which may be desired.

Preliminarily and briefly stated, our invention consists in making a plurality of arbitrarily chosen subdivisions of each stop (and by the term stop here used is meant any single set of sounding devices by which a given instrument may be simulated, according to the usual definition of the word), subdividing the tracker bar into a plurality of playing sub-sections, and interchangeably and operatively associating the control of the playing sub-divisions of all the stops with the said sub-sections without regard to the correspondence of pitch of any sub-division of any stop to the location of the temporarily associated sub-section of the tracker bar. The several subdivisions of each stop are preferably made such that the parts of the several subdivisions overlap each other, by which is meant that certain notes lie in divisions of a different order. This will be more fully comprehended from the detailed description which follows.

Our invention further includes the arrangement and association of the sub-divisions of the stops with the playing sub-sections of the tracker bar, which consists in the provision of means for selecting the stop, simultaneously selecting the part of the stop in which the sub-division lies bass or treble, and then the subdivision itself.

The invention can be carried out with a variety of apparatus.

Although the system is essentially electrical, wind pressure must of course be used to blow the pipes, and in addition to this, the tracker-bar and music record sheet operate upon the electrical system through a set of primary circuit-closing pneumatics or pneumato-electrics. Obviously these pneumato-electrics might be replaced by suitable electric relays or by direct circuit control from the tracker-bar itself. Upon a full understanding of our invention, it will be obvious also that the electrical system may be replaced by a pneumatic system by which our invention may be practised, but with far less efficiency.

Referring to the drawings: Figure 1 is a diagram showing one set of complete circuits from the tracker bar to the sounding device. Fig. 1^A and Fig. 1^B together constitute a diagrammatic layout of the entire system from which many of the details are omitted for the sake of clearness. Fig. 1^C is a diagram of an enlarged apparatus of the form of Fig. 1^B for use also in connection with the apparatus of Fig. 1^A. Fig. 1^D is a diagram of a modification of the circuits of Figs. 1^B and 1^C by which the same results are secured in a different manner. Figs. 2^A and 2^B are detailed diagrams showing in full two or three elemental circuit connections which are clearly illustrated in Figs. 1ᴬ and 1ᴮ in their relation to each other. The uppermost elemental circuits of this figure are stop control circuits, while the lower circuits (the lowermost one of which is shown complete) are note control circuits. In these figures also the several circuit controlling devices and one of the sounding devices of a single stop are shown in transverse section. Figs. 3ᴬ and 3ᴮ show in plan the circuit closing devices of Figs. 2ᴬ and 2ᴮ in the same positional relation to each other as they bear in Figs. 2ᴬ and 2ᴮ, together with such of the elemental circuit connections shown in Figs. 2ᴬ and 2ᴮ as may be clearly indicated in plan. Fig. 4 is an enlarged plan view of the principal circuit controlling device of the system which we denominate the range selector and through which a plurality of subdivisions of any stop may be made. Fig. 5 is a transverse section of the same on the line 5—5 of Fig. 4. Fig. 6 is a plan view of one of the actuating magnets A of the part control device taken above its armature. Fig. 7 is a detail view of a group of note control circuits shown in diagram in Figs. 1ᴬ and 1ᴮ. Fig. 8 is a similar view of the same class of circuits showing a further detail and enlargement thereof.

The range selector of Figs. 4 and 5 comprises in this embodiment a base board 10 of insulating material on the face of which are laid parallel and close to each other a plurality of note control bars $Nb$ of conducting material which are adapted to be connected respectively to the controlling elements (magnetically actuated valves) of the sounding devices of the stops. In this part control device, each note of the stop with which it is to be associated is represented by a bar $Nb$. Overlying these bars are a plurality of rows 16', 8', 4' of electric gang switches 2, 3, 4, etc., 1, 2, 3, etc., and 1, 2, 3, etc. Each of these switches comprises a body block of insulating material carrying a plurality of movable contacts 11 adapted to coöperate and make circuit connection with an equal number of note bars $Nb$. The switches in the rows are pivotally mounted on posts 12 at each end thereof and arranged end to end. These switches 1, 2, 3, etc., by the ranges of note bars which they cover and by their relative position (which may be made anything desired), effect the division of the note bars $Nb$ and resultingly of the stop which they represent into a plurality of subdivisions or ranges each of a plurality of notes. Thus each of the switches 2, 3, 4, etc., of row 16' effect one subdivision, 1, 2, 3, etc., of the next row 8' other sub-divisions and 1, 2, 3, etc., of the third row 4' still other subdivisions. It will be observed furthermore that some of the switches overlap some of the others in that the same note bars $Nb$ are accessible through switches of a different linear or numerical order. Each of the switches 1, 2, 3, etc. (see Fig. 5), is biased to a normally open position by a spring 13 between the base board 10 and an arm 14 connected with the switch, the spring 13 surrounding an operating rod 15 which passes through the arm 14 at one end and is connected thereto by nut 16, and which at its lower end passes through the base board 10 and connects with an armature 17 operated by a group of actuating magnets $a$ secured to the under side of the base board 10. The face of the actuating magnets $a$ is flush with the under face of the base board 10 while the armature 17 works in a cavity therein. As illustrated the actuating magnets comprise a group of four (see Fig. 6), while the armature is substantially circular and is acted upon by all four magnets. This of course may be supplanted by any well-known construction. The lower end of the spring 13 is seated in the socket 18 surrounding the rod 15 but it does not pass through to the cavity 17ᵃ. From still further reference to Fig. 5 it will be seen that the bars $Nb$ are strips of metal laid in transverse slots in the face of the base board 10 and retained therein by longitudinally extending overlying bars 19 secured by screws to the base board. The posts 12 which carry the switches are shown as simply doweled into the top of the board, but they may be otherwise secured, especially if made of metal. In this embodiment of course they are made of wood or other insulating material as also are the body blocks 20 of the switches which carry the contacts 11.

Referring now to Fig 1ᴮ in which this range selector is designated 1PPC, it will be seen that each bar $Nb$ is connected to a sounding device as designated by one of the circles SD. This is shown elementally in Fig. 2ᴮ wherein both the range selector 1PPC and one of the sounding devices SD are shown in transverse section. The sounding device SD is equipped with the type of control disclosed in the copending application of Frank A. Pilcher, Serial No. 696,536, filed May 10, 1912. The actuating magnet $s$ is positioned over a duct 21 opened at one end to atmosphere through pipe 22, and the upper end of which is normally closed by disk valve 23, while at the other end it opens into a pneumatic 24 in wind pressure chest 25 and connected by link 26 to valve 27 which governs the flow of air from the wind chest 25 to the pipe $p$ of the sounding device. The disk valve 23 is directly beneath the actuating magnet $s$ and is operated thereby, the disk being made of or having attached to it magnetic material. An opening 29 through the face plate 28 of the magnet supplies air from chest 25 to the pneumatic 24, and this opening 29 is closed when valve disk 23 is lifted. Under this condition suction being applied through 22, the pressure of air in the wind chest 25 collapses pneumatic 24 and opens valve 27. Immediately the magnet S is deënergized, the vent 22 is closed, and the port 29 opened, whereby pneumatic 24 is filled from the wind chest and the valve 27 is closed by the pressure of its spring. Connection of the magnets $s$ to the note bars N$b$ is made by conductors N$c$.

Referring now to Fig. 2$^A$ and Fig. 3$^A$, the tracker-bar is designated generally by TB. The tracker-bar is of the standard type containing two rows, upper and lower, of perforations. Arbitrarily we have chosen to effect the actuation of the notes from the lower row of perforations, and to effect the stop control from the upper row of perforations. Arbitrarily also we divide both the upper and lower rows into right and left sections designated T′ and T$^2$ for the upper row and T$^3$ and T$^4$ for the lower row. Referring to Fig. 1$^A$ and Fig. 1$^B$ in which the circuits and devices are diagrammed the upper and lower sections are similarly designated T′, T$^2$ and T$^3$, T$^4$, respectively, but are shown in rectilinear arrangement, the upper row on the uppermost portion of the sheet and the lower row on the lowermost portion of the sheet. Suitable tubes $t$ extend from the tracker perforations to corresponding banks of pneumato-electrics P′ to P$^4$. These pneumato-electrics of sections P$^3$ and P$^4$ control note circuits N′, N$^2$, etc., which connect with the contacts 11 of the part-control device PPC (see also Figs. 2$^A$ and 2$^B$). These pneumato-electrics P$^3$ and P$^4$ and the pneumatics P′, P$^2$ as well, are all of a standard type. In Fig. 2$^A$ their construction is clearly shown on the lower left of the figure. On one side of the chest 30 which may be connected with the source of wind pressure or suction in any known manner, is pneumato-electric $n$ to the outer or movable side of which are connected a multiple number of contacts 31, in this case three, insulated from each other. Fixed to the chests 30 are coöperating common fixed contacts 32. When the air from the chest 30 is vented through the tracker and note sheet, the pneumato-electrics $n$ collapse against the sides of the chests 30 and simultaneously close the three movable contacts 31 upon the coöperating fixed contacts 32. The detailed construction of these pneumato-electrics may be varied as desired.

The pneumato-electrics of groups P′ and P$^2$ which are used for the stop control are slightly different in form but are essentially the same in operation. As shown by the section at the top of the row of pneumato-electrics P′ and P$^2$ in Fig. 2$^A$, these pneumato-electrics comprise movable members 33 in chambers 34 which divide the chambers 34 into upper and lower compartments, the lower one of which connects with tube $t$ and with the tracker, while the upper one is connected to a suction device through duct 35. A small bleed 36 furnishes a means for communication between the upper compartment and the lower, whereby when the tracker perforations are closed, the movable member 33 is down, and the pneumato-electric collapsed, but when the tracker perforations are opened, the air pressure on the under side of the movable member 33 is raised and the member itself raised to an upper position, the suction through duct 35 taking all of the inrushing air through bleed 36. An electric switch comprising a fixed terminal 37 and a movable spring terminal 38 overlying and bearing upon the movable member 33 of the pneumato-electric is closed by the pneumato-electric whenever the perforations of the tracker are opened to atmosphere and member 33 rises. If desired, of course pneumato-electrics P′ and P$^2$ could be made with the movable member on the outside of the valve box as are the pneumato-electrics P$^3$ and P$^4$. So also a multiple number of contacts might be closed by the pneumato-electrics P′ and P$^2$.

The circuits 4N′, 4N$^2$, etc., which extend from the multiple contacts of pneumato-electrics P$^3$ and P$^4$ are the circuits over which according to the method of our invention, any desired part of any stop is operatively and interchangeably temporarily associated with any desired playing sub-section of the tracker. The tracker and hence the pneumato-electrics P$^3$, P$^4$ are as shown in Figs. 1$^A$ and 1$^B$ arbitrarily divided into a plurality of playing sub-sections designated 1, 2, 3, 4, etc. There is connected with sub-section numbered 3 a pneumato-electric for each contact 11 of range selector switch numbered 3 in any row of switches of the range selector 1PPC. Preferably therefore, though not necessarily, the number of notes controlled from all numerically corresponding switches of the range selector 1PPC are made equal, and a corresponding number of pneumato-electrics P$^3$ P$^4$ is designated to constitute playing sub-sections associated therewith. It will be noted that the three switches 3 of the range selector 1PPC cover different groups of notes bearing each a definite pitch relation to the other. One contact 31 of each pneumato-electrics of section P$^3$ of playing sub-section No. 3, is connected by a conductor such as 4N$^3$ (see Figs. 1$^A$ and 1$^B$) to one of the contacts 11 of switch 3 in one row of switches of the range selector 1PPC, which row is designated 4$^7$, while another contact 31 of each of the No. 3 group of pneumato-electrics P$^3$ is connected by a conductor such as 8N³ to switch No. 3 in the second row 8′ of the switches of the range selector 1PPC, and the remaining contacts 31 are connected by conductors 6N³ each to a contact 11 of switch 3 in the third row of switches 16′. Connection of the conductors 4N³, 8N³, 6N³ is made to contacts 31 of sub-section No. 3 and contacts 11 of switches 3 in corresponding numerical order, so that the tracker perforations are associated with the sounding devices controlled through switches 3 in the order of the chromatic scale. Due to the fact that the switches 3 each coöperate with a different group of note bars however, any desired one of the three groups of notes, differing though they may in pitch as respects the playing sub-section of the tracker associated with the group of pneumatics 3 through which they are controlled, may be associated at will with this playing sub-section. Similar connection is made between switches 2 of the rows 4′, 8′ and 16′ of the range selector and that group of pneumato-electrics 2 associated with playing sub-section 2 of the tracker, and so for 4, 5 and 6, or a greater number, should a greater number of subdivisions of the tracker into playing sub-sections be desired. The net result of this method of subdivision and association is that a desired note controlled through any bar N$b$ may be reached from three different control ducts in three different sub-sections of the tracker. Thus looking closely at Figs. 1ᴬ and 1ᴮ, it will be seen that the note bar designated N$b$′ may be reached through each of conductors 4N′, 8N², and 6N³ which connect respectively with pneumato-electrics in groups 1, 2 and 3 of section P³ and the same is true of each note of the stop.

Thus the fact which gives rise to the great advantage of our invention becomes apparent, the fact that since each note may be reached from a plurality of playing sub-sections when any usual sub-section for a given part is busy in the playing of some other part, the given part which it is desired to play may be reached from some other sub-section on the tracker. In a simple case suppose that it is desired to play a solo part on the group of notes numbered 2. This group of notes may be reached through switch 2 of the 8′ row or through switch 3 of the 16′ row or through switch 1 of the 4′ row. The playing sub-section on the tracker corresponding in pitch location to the notes governed through range selector switch 2 is playing sub-section No. 2 acting through group 2 of pneumato-electrics P³. Suppose this sub-section is being used to play another group of notes in this same manual or in some other stop (the latter through multiple connections to be presently described). Then the group of notes 2 covered by switch 2 of row 8′ may be played either through switch 1 of the 4′ row and playing sub-section No. 1, or switch 3 of the 16′ row and playing sub-section No. 3 of the tracker, for both switches 1 and 3 of rows 4′ and 16′ coact with note bars N$b$ of part 2 of the stop. This fact grasped, the unlimited scope of this instrument will be perceived in all its fullness. With this perception it will be seen that by increasing the number of row subdivisions, 16′, 8′, 4′, of the stop from three say to five or six, and correspondingly increasing the number of multiple contacts 31 on the pneumato-electrics P³, P⁴ and the number of multiple circuits 4N′, 4N², etc., reaching therefrom, after the manner shown in Fig. 8 and Fig. 1ᶜ, that any desired part whatsoever of any stop may be operatively associated with any desired playing sub-section on the entire tracker without regard to correspondence in pitch location of the playing sub-section with the pitch of the group or range of notes it is desired to play, and this either to the inclusion or exclusion of other parts of the same stop and all other stops.

In order that this arrangement of connections may be understood in all its details, a portion of the connections between parts 2 and 3 of section T³ of the tracker TB, and the correspondingly numbered switches of the range selector PPC are shown in full detail in Fig. 7. In the diagrammatic views of Figs. 1ᴬ and 1ᴮ, the large extent of the layout of the system as a whole has prevented more detail showing, but in Fig. 7 the detail is such that the circuit arrangement may be grasped at once.

Following the same system of numbering the connections which pertains in Figs. 1ᴬ and 1ᴮ, it will be seen that one of the multiple contacts 31 of each pneumato-electric 3 of playing sub-section 3 of the tracker is connected by conductors 6N³ to switch 3 in the 16′ row of the range selector PPC, that the second contact in each pneumato-electric is connected by a conductor 8N³ to the switch No. 3 in the 8′ row of the range selector PPC, and the third contacts of the pneumato-electrics are connected by conductors 4N³ to switch No. 3 in row 4′. To the groups of pneumato-electrics above group No. 3 associated with playing sub-section No. 3 of the tracker, connections are similarly made to the switches 2 in each of the several rows, and from group No. 1 to switches 1 in the several rows, it being noted that some of the switches No. 1 are located at the treble end of the part control PPC, while others are located at the bass end. The groups 2 and 1 of the pneumato-electrics are operable from playing sub-sections 2 and 1 respectively of the tracker. The row of sounding devices of a stop operated through the range selector PPC is designated SD.

Referring again particularly to the control from playing sub-section No. 3 through group of pneumato-electrics No. 3, it will be seen that the entire range of notes operable from this sub-section No. 3 is defined by the entire reach of the three switches No. 3; that is by operating one or another of the switches No. 3, any one of three different groups 2, 3, 4 of notes may be controlled from playing sub-section 3 of the tracker. The first of these groups of notes is reached through row 16′ of the range selector, the second through row 8′ and the third through row 4′. Preferably the group under control of switch 3 in the 8′ row is that part 3 of the stop corresponding in pitch to the pitch location of playing sub-section 3 of the tracker, while the parts 2 and 4 of the stop controlled through switches 3 in the 4′ and 16′ rows contain notes respectively an octave higher and lower than the corresponding notes of part 3 of the 8′ row. Thus from playing sub-section No. 3 may be reached parts of the stop both above and below in pitch, the pitch location of sub-section No. 3 of the tracker.

Again it may be stated that it is obvious that according to our invention the system may be extended to give a greater range of control from any given tracker sub-section by first providing a greater number of contacts 31 and a greater number of multiple circuits extending therefrom controlling a correspondingly greater number of rows as 16′, 8′ and 4′ of the stop. Thus as indicated in Fig. 8 six contacts 31 could be provided on each pneumato-electric, and the three additional contacts connected by multiple circuits with the switches 1, 2, 3, etc. to those of additional rows 64′, 32′ and 2′, located two on the left and one on the right of the present rows. It is to be particularly observed that through this means six different parts of the stop may be played from any given playing sub-section on the tracker, and furthermore that these six different parts cover practically the entire scale range in any given stop. It is obvious that the various correspondingly numbered parts of the several rows may be made to have a strictly octave relation to each other or not as desired. Moreover the number of notes in the differently numbered parts or ranges may be varied. It is also possible to place these switch rows in any other relative arrangement desired or by multiple connections to operate two or more switches simultaneously, each with a different division of notes in the parallel range selector PPC, thus giving the greatest flexibility to the use of the sounding devices of the different stops. This will appear more fully hereinafter.

Having according to our purpose made the requisite division of the stop and tracker, in fulfillment of our purpose the various parts of all the divisions are operatively and interchangeably temporarily associated with any desired playing sub-section of the tracker, and as aforesaid we have also devised means to carry this out. This latter means carries out our purpose by a primary selection of the desired stop, a second selection between the treble and bass parts of the stop, thus singling out the part containing the range of notes it is desired to play from the given tracker sub-section, a third selection between the several rows of range selector switches 16′, 8′, 4′, etc. of the selected stop according to the pitch of the range of notes it is desired to play, and a fourth selection determining the particular range of notes of the selected stop. The apparatus by which this is carried out comprises three principal elements, (1) a part selector, by means of which the treble and the bass portions of any stop of pipes may be selected, (2) a switch-grouping selector by means of which the general pitch of the part to be played is fixed, and (3) suitable associated locking circuits and locking circuit switches, the function of which is to lock temporarily the control circuits established through the preceding two instrumentalities.

The part selector CS is shown in detail in Figs. 2$^A$ and 3$^A$. It comprises a pair of normally closed gang switches $ts$ and $bs$ respectively, controlling actuating circuits $cs$, the initial closure of which is governed by pneumato-electrics of sections P′ and P$^2$ associated with the upper row of tracker perforations T′, T$^2$. The switches $ts$ and $bs$ are built structurally along the lines of the range selector 1PPC which is described in detail with reference to Figs. 4 and 5. Base boards 39 have set on their upper faces conductor bars 40 from which connection is made by movable contacts 41 carried by pivoted insulating blocks 42 with the conductors $cs$. Like the switches 1 to 6 of the range selector 1PPC, the blocks 42 are pivoted on posts 43 set up in the base board 39, and are operable to open and close the contacts 41 by means of actuating magnets $m$ secured to the under side of the board 39 and connecting by operating rods 44 with the switch blocks 42. As shown in Fig. 1$^A$ there are provided two of the part selectors CS designated CS$^1$ and CS$^2$ respectively, one of them in connection with each of sections P′ and P$^2$ of the upper row of stop control perforations of the tracker. There are also provided two of the switch grouping selectors PS (see Fig. 1$^B$) designated PS′ and PS$^2$, one for each section T′, T$^2$. These are shown in detail in Figs. 2$^B$ and 3$^B$ respectively. Like the part selectors CS, the switch grouping selectors are built along the lines of the range selector 1PPC. The base board 45 in this instance is substantially the same in width as the base board 10 of the range selector PPC, and carries transverse bars 46 in its upper face which are in direct connection with conductors *lsb* and *lst* (see Figs. 1<sup>A</sup> and 1<sup>B</sup> and Figs. 2<sup>A</sup> and 2<sup>B</sup>) connected at their leading ends to the bars 40 of part selectors CS. Overlying and coöperating with the bars 46 of the switch-grouping selectors PS are in each case three or more gang switches 16<sup>s</sup>, 8<sup>s</sup>, and 4<sup>s</sup> respectively, which switches, as shown clearly in Fig. 2<sup>B</sup> are normally open and carry sets of gang contacts 47 which coöperate individually with the individual bars 46. These switches 16<sup>s</sup>, 8<sup>s</sup> and 4<sup>s</sup> are actuated like the switches *ts* and *bs* of the part selectors CS by magnets *m* located beneath the base board 45. Actuating circuits *pc* extend respectively from the contacts 47 associated with each individual bar respectively to actuating magnets *a* of the switches 1 to 6 of the range selector PPC. Referring to Fig. 1<sup>B</sup>, it will be seen that of the circuits *pc* associated with the same bar 46 of the switch-grouping selector PS through contacts of the switch, that one controlled by switch 16<sup>s</sup> governs actuating magnet *a* of a switch in the 16' row, that one controlled by switch 8<sup>s</sup> governs actuating magnet *a* of a switch in the 8' row, and that one controlled by switch 4<sup>s</sup> governs an actuating magnet *a* in the 4' row. As respects any single bar 46 and the actuating circuits *lst* or *lsb* and *cs* connecting therewith, the actuating magnets *a* with which any group of circuits *pc* is connected, are those actuating magnets which operate switches, in the several rows bearing the same numerical designation. Thus all switches numbered 1 are associated with one bar 46, those marked 2 with the next in order, etc. (See again Fig. 1<sup>B</sup> in which the actuating magnets *a* are designated by small circles at one end of the rectangles designating the gang switches. The battery connections are not shown).

Now reviewing the connections just described in the part selectors CS and the switch-grouping selectors PS, it will be seen that the circuits *cs* are initially closed by the pneumato-electrics of groups P' and P<sup>2</sup> which have hereinbefore been designated as stop controls, and the actuating circuits emanating therefrom may if desired be called stop circuits. Between the pneumato-electrics P', P<sup>2</sup> and the part selectors CS' and CS<sup>2</sup>, the circuits *cs* divide, being multiplied between the treble switch *ts* and the bass switch *bs* of the part selectors CS' and CS<sup>2</sup> in each case. Emanating from the part selectors CS are circuits *lst* and *lsb*, each of them connecting with a bar 46 on the associated switch grouping selector PS. Each pneumato-electric of the groups P' and P<sup>2</sup> therefore governs a circuit *lst* and also a circuit *lsb*, the one *lst* leading to the treble portion of the range selector through the part selector CS; and switch grouping selector PS its connected bar 46 controlling the actuation of a group of switches in the treble part of the range selector 1PPC, and the other *lsb* similarly leads to and controls a group of switches in the bass portion of the range selector 1PPC. Thus for instance referring to Figs. 1<sup>A</sup> and 1<sup>B</sup>, it may be said arbitrarily that the different branches *lsb* of circuits *cs* control respectively the actuation of correspondingly numbered switches of the several subdivisions of the range selector 1PPC numbered 1, 2 and 3, while the different circuits *lst* similarly control the actuation of the switches numbered 4, 5 and 6. Obviously by opening one of the switches *ts* or *bs* of the part selector CS, the actuating circuit *cs* is confined to the branches through the other, and selection is thus made between the bass and treble portions of the range selector and consequently the stop. Thus if a part in the treble is desired, switch *ts* is allowed to remain closed while switch *bs* is temporarily opened. Thus circuit *cs* is extended by the associated one of the circuits *lst* to the switch grouping selector PS, and by the actuation of the proper one of the switches 16<sup>s</sup>, 8<sup>s</sup> and 4<sup>s</sup>, selection is made of the particular subdivision of the selected part of the range selector 1PPC which contains the particular switch through which the range of notes it is desired to play may be reached. As aforesaid, the switch 16<sup>s</sup> controls the actuating magnets *a* of the switches controlling groups of notes in the 16' row, and switches 8<sup>s</sup> and 4<sup>s</sup> similarly control respectively magnets *a* in the 8' and 4' rows. Therefore in the practice of our invention through the use of this apparatus, in order to associate any desired group of notes of the stop operatively with any desired playing subdivisions on the tracker, it is only necessary to actuate that one of the pneumato-electrics P', P<sup>2</sup> which governs the circuit *cs* which is multiplied respectively to treble and bass of the particular stop containing the group of notes, and simultaneously to actuate one of magnets *m* of the part selector CS to open the switch *ts* or *bs* which does not contain the part of the stop it is desired to play, and also to operate that one of the actuating magnets *m* governing switch 16<sup>s</sup>, 8<sup>s</sup> or 4<sup>s</sup> as the case may be which is identified with that one of the groups of switches 16', 8' or 4' containing the switch controlling the range of notes which it is desired to play. Thus circuits *csm* of the actuating magnets *m* of the part selectors CS are controlled from the tracker through two ducts and two pneumato-electrics in each section P' and P<sup>2</sup>, while the three actuating magnets *m* of the switch-grouping selector PS are directly actuated over control circuits *psm* individually connected to a corresponding number of pneumato-electrics in each of sections P' and P². There are required for the government of these control circuits therefore as many ducts (or twice as many ducts, depending upon whether one or two PPC per stop are used) in the tracker for each stop as there are circuits *cs* or groups of switches 1, 2, 3, etc., in either the treble or bass of the range selector, and additionally two ducts for each part selector CS', CS² for controlling the actuating magnets thereof, and three ducts for each switch grouping selector PS', PS² for controlling the actuating magnets *m*. In the embodiment shown in Figs. 1^A and 1^B, only three circuits *cs* and three control ducts therefor are required per stop of pipes, for there are only three switch groupings or rows 16', 8', 4' respectively of the range selector and hence portions of a part of the stop. For each additional stop controlled, there will be provided an additional group of control ducts in the tracker-board, but obviously it is not necessary to commensurately increase the number of part selectors or the number of switch-grouping selectors, (though this may be found desirable as will appear) and the number of control ducts and pneumato-electrics governing circuits *psm* and *csm* is therefore a constant.

In order that the control perforations in the record sheet may not have to be continuous, the actuating magnet *a* of each switch is connected with the locking circuit controlled by a special switch. Two groups of these locking-circuit-switches LD', LD² are shown in Fig 1^A, one group being associated with each part selector. These locking circuit-switches are so constructed and connected that when an actuating circuit *lst* or *lsb* is first energized, the controlled actuating magnet *a* is locked through the associated locking circuit switch LD independently of the continued energization of circuit *lst* or *lsb*. The circuits *lst* and *lsb* need therefore to be but momentarily energized. Upon the following energization of the circuit, the locking circuit-switch LD acts to open the circuit of the previously locked actuating magnet *a* and thus to release the associated switch of the range selector 1PPC. One perforation in the record sheet is therefore required to close a switch over a circuit *lst* or *lsb* and a second perforation following the first to open the switch. Since the locking circuit-switches LD are between the part selector CS and the switch grouping selector PS in each case, the proper part selector has to be energized each time the locking circuit is to be made or broken in order to distinguish between the locking devices associated with circuits *lst* and those with the connected multiples *lsb*. But the pitch selector PS does not have to be actuated, for the locking circuits *ls* as will be seen, pass to the magnets *a* of the range selector PPC independently of the switch grouping selectors PS.

The locking circuit-switches LD comprise magnetically operated electrical switches of a type similar to the electromagnetically actuated stop valve shown in the co-pending application of Frank A. Pilcher aforesaid. They are shown in detail in Figs. 2^A and 3^A. Each of them comprises a pivoted switch member 48 carrying at one end a movable contact 49 adapted to make circuit with the fixed contact 50. The pivoted switch member 48 is adapted to be actuated by a vertically reciprocable actuating tongue 51 which depends from the armature 52 of actuating electromagnet 53. The armature 52 is of the plunger type and is normally held in an upper retracted position by spring 53^a against an adjustable stop 54. The actuating tongue 51 is pivoted at 55 to the armature 52 and is held normally in a central position by leaf springs 51^s which bear on opposite sides thereof at their outer ends and are secured at their inner ends to the armature 52. Preferably these springs are formed integrally with each other as shown, being simply bent to the proper shape. On the movable member 48 are provided cam surfaces 57 inclined oppositely with respect to the pivotal point 58 and with respect to the normal position of the actuating tongue 51. Switch member 48 will remain in each extreme position of its oscillation as defined by stops 59. In operation the yieldingly held tongue 51 on one reciprocation passes down one inclined face 57 to operate switch member 48 to close the switch contacts 49—50 and the locking circuit in which they are included, while on the succeeding reciprocation of the member 51 it passes down the opposite face 57 which has been presented to it through the initial oscillation of the member 48, and acts to return the switch member 48 to its normal position and open the previously closed contacts 49—50. Thus repeated energization of the electromagnets 53 serves to alternately close and open the contacts 49—50, and these contacts may be retained closed or open as long as may be desired without continued energization of magnets 53.

Actuating magnet 53 is connected directly to one branch of circuit *lst* in each case as clearly shown in Fig. 1^A. Contacts 49—50 as shown in Figs. 2^A and 2^B are connected directly in locking circuit *ls* which extends from battery B, includes contacts 49—50, and from thence directly to locking bars *lb* of the range selector. Each locking circuit *ls* through connection with a plurality of bars *lb* controls commonly the locking of a plurality of switches 1 to 6 of the same numerical designation. Referring particularly to Fig. 4, it will be seen that there is provided among the bars N$b$, a locking bar $lb$ for each of the switches 1 to 6. These locking bars in the plan view of Fig. 4 are characterized in each case by individual and exclusive association with a locking contact 11′ of one switch only.

Referring again to Figs. 2$^B$ and 3$^B$, together with Fig. 1 it will be seen that the locking circuit $ls$ extends through any associated bar $lb$ through contact 11′ of the particular switch, as in sub-division 4′, with which it is associated, and continuing thence extends by conductor 12 to junction $j$ of conductor $pc$ with magnet $a$, actuating switch No. 1, and thence through the magnet $a$ and to battery by way of the common conductor C. Thus after its initial energization over a circuit $pc$ from the switch grouping selector as previously traced, the energization of magnet $a$ in any case is maintained by locking circuit $ls$ extending from the positive side of battery by way of conductor $ls$, (Figs. 2$^A$ and 2$^B$), contacts 49—50 of locking device LD, the continuation of the locking circuit $ls$ to locking bar $lb$, contact 11′ of the switch actuated and continuing therefrom to junction $j$ and through windings of magnet $a$ by common return C to the negative side of battery. Referring to Fig. 1$^B$ and the range selector 1PPC, it will be seen that one locking circuit $ls$ controls in multiple as aforesaid all switches numbered 1, that another controls in multiple all switches numbered 2, and another the switches numbered 3, and so on, the locking bars $lb$ being shown heavier than the note bars N$b$ and passing directly through the centers of the circles designating the actuating magnets $a$. In other words, each locking circuit controls a plurality of switches of the same number in the range selector 1PPC. For instance, one locking device controls switch No. 1 in each of the 16′, 8′ and 4′ rows of the range selector, a second locking device controls switch No. 2 in each row and so on, there being six locking circuit switches for each stop used. Thus any desired part of the stop may be locked in operative association with any desired part of the tracker bar, may be retained in such association as long as it is desired to play from a particular playing sub-section on the tracker bar, and may thereupon be released. It is particularly to be noted that the only continuous energy necessary to retain in locked position any switch of the device PPC through which the association is effected, is that energy taken by its own actuating magnet $a$, the actuating magnets of the part selectors, the switch grouping selectors, and the locking devices LD being normally deënergized.

Through connection of the locking circuit $ls$ with the junction $j$, battery is retained on the branch of the circuit $pc$ connected with the junction $j$ after the opening of the initial energizing circuit. In order to prevent back circuit or stray circuits over the wires $pc$ from the junction $j$ the wires $pc$ are individually connected to the junction $j$ through normally closed contacts 60—61 in the locking circuit switches. There are three sets of these contacts on each movable member 48 of each locking device, each set of contacts 60—61 controlling one of the circuits $pc$ connected to actuating magnets $a$ of the group governed by the corresponding locking device. The contacts 60—61 are arranged to be opened immediately after the contacts 49—50 are closed, but not before. In short the switch member 48 makes contacts 49—50 before it breaks contacts 60—61. Thus the energizing circuit $pc$ of any magnet $a$ of the part and pitch control PPC is not broken at contacts 60—61 until after the locking circuit $ls$ of the group magnets to which it belongs is closed, thus opening the initial energizing circuit $pc$ of the remaining 1PPC switches of the same numerical order, until after a subsequent operation of the locking device, for the purpose above stated. It has been impracticable to show the details of Figs. 2$^A$ and 2$^B$ in the general diagrams in Figs. 1$^A$ and 1$^B$, but it will be fully understood that each elemental circuit indicated in Figs. 1$^A$ and 1$^B$ is of the form shown in detail in Figs. 2$^A$ and 2$^B$.

Now note the system at large and its operation. Referring to Figs. 1$^A$ and 1$^B$ it will be seen that only one stop of sounding devices SD is shown. But a distributing terminal board J is shown in the multiple note control connections 4N′, 8N$^2$, etc., and from this junction board the connections 4N′, 8N$^2$, etc., are intended to be multipled to range selector PPC (not shown) connected with other stops. Thus there will be a stop or pipes for the organ, a stop or pipes for the flute, a manual for the violin, a stop or pipes for the oboe, etc., each with one or more associated range selectors PPC which are connected to the same points on the distributing terminal board J and thereby in the same relation to the tracker bar as are the range selectors PPC which are shown. Furthermore, emanating from the groups of locking circuit switches LD are shown additional locking circuits $lsm$ which extend in sets to the respective range selectors of these other stops for their government. So also there are indicated correlated switch actuating circuits $ps$M extending from the pitch selectors PS. These circuits $ps$M extend in sets correlated to the sets $lsm$ of the locking circuits to the actuating magnets of these other range selectors in a manner essentially similar to that shown. These sets of circuits $lsm$ and $ps$M are energized over circuits $cs$ controlled from the tracker-board in the same manner as are the circuits $ls$ and $pc$ which are shown in detail.

Referring to Fig. 3ᴬ which shows the perforated record sheet which governs the admission of air to the ducts in the tracker, we have illustrated the ducts through which the actuation of the magnets $m$ of the part selector and switch grouping selector respectively are controlled. Thus all these ducts in sections T′ and T² of the upper row of ducts which govern actuating magnets $m$ of part selectors CS′ and CS² are designated respectively $dt′$, $db′$ and $dt²$ and $db²$ respectively, while those three in each section T′ and T² through which actuating magnets $m$ of the switch grouping selectors PS′ and PS² are controlled, are designated respectively $16d′$, $8d′$, $4d′$ and $16d²$, $8d²$, $4d²$. The remaining ducts $d′$, $d²$, $d³$, etc., in groups of three as indicated connect respectively with the groups of actuating connections $cs$ of which there is one group as aforesaid for each range selector PPC connected with each stop. Each duct $d$ and controlled circuit $cs$ of any group is definitely correlated numerically to a definite sub-section of the tracker-bar obviously there are in the actual board a much larger number of groups of ducts. Lack of space prohibits showing a larger number herein.

As has been stated, allowing three ducts $d$ for the control of the actuating magnets $a$ of one range selector PPC for each stop of pipes, there is sufficient space on the standard tracker for the provision of about forty such groups, thus providing for the control of forty or more stops. Since in some stops of sounding devices, the parts played are always the same, such stops may be controlled together in multiple from a common group of ducts $d′$, $d²$, $d³$, etc., and on account of this fact the total number of stops controllable from a single tracker-bar is increased upward of forty. Always two stops of the same character, such for instance as two first violin stops, may be governed from the same group of ducts $d$. So also stops in which the parts played always differ by an octave in pitch may be controlled from a common group of ducts $d$ by the simplest multiple connection thereto.

To play from any desired playing sub-section of the tracker any desired part of any stop, it is necessary only to provide one perforation in the record sheet to coact with the particular duct $d$ of the group identified with the particular stop, the particular duct $d$ of the group being that one which is associated with the particular sub-section from which it is desired to play the part. As has been shown a plurality of parts of the stop each of a different range are accessible through the range selector 1PPC from each playing sub-section of the tracker. Having provided this perforation to coact with the proper duct $d$, as for instance the perforation $o$ shown on a line with the duct $d$ of the first of group $d⁴$ in section T² of the tracker-bar, it is necessary only to provide two additional perforations on the same transverse line as the perforation $o$, one $o²$ to coact with that one of the group of ducts $dt²$ and $db²$ through which the actuation of the proper magnet $m$ is effected to select between parts of the treble and bass, and the other $o³$ to coact with that one of the group of ducts $16d²$, $8d²$ and $4d²$ through which the actuation of that one of the magnets $m$ of the switch grouping selector PS necessary to select the group or row containing the part, is effected.

To take a specific example, suppose for instance it is desired to associate playing sub-section No. 2 of the tracker (by which it is meant the second group of ducts 2 in section T³ of the note control ducts of the tracker-bar) with a part of stop No. 1 removed from the playing sub-section in pitch say to an octave below. This part is No. 2 part in the 16′ subdivision of the range selector 1PPC (see Fig. 1ᴮ) and is controlled by switch No. 2 in the 16′ subdivision. This part then, to repeat, is in the bass portion of stop No. 1, is in the 16′ row, and is removed from sub-section No. 2 of the tracker from which it is desired to operate it by an octave in pitch. Stop No. 1 is controlled from section T′ of the tracker. A perforation $o′$ is provided to coact with the second duct $d$ in the first group of three ducts $d′$, this second duct being associated with sub-section No. 2 of the lower row of perforations. This group of ducts $d′$ is associated with the actuating connections $cs$ of range selector 1PPC associated with stop No. 1. This second duct $d′$ is associated with the second of the three connections $cs$, which in turn is multipled to the range selector switches 2 in each of the three rows of range selector 1PPC, the switches 2 being connected with sub-sections No. 2 of the tracker. A perforation $o²$ is provided to coact with duct $db′$, thus actuating magnet $m$ of the switch $ts$ to open the multiples $lst$ of connections $cs$ as shown in Fig. 1 which extend to the treble portion of the range selector 1PPC. Thus selection is initially made between the treble and bass portions of the stop, the actuating connections being extended by circuit $lsb$ to the bass portion. A perforation $o³$ is then provided to coact with duct $16d′$ through which the actuation of magnet $m$ is effected resulting in the closure of the $16s$ section of switch grouping selector PS′ as indicated in Fig. 1. (Examine closely Figs. 1 and 1ᴮ). In this manner the selection of the particular row 16′, 8′ or 4′ which contains the desired part is effected. The actuating magnet $a$ being energized, switch No. 2 of the 16′ row is closed as indicated in Fig. 1, thus connecting that part No. 1 of stop 1SD through switch 2 of the 16' row to the multiple connections 6N² which extend to playing sub-section No. 2 of the tracker. Having been actuated, the switch 2 is locked over the circuit 1s in a manner previously described, and clearly shown in Figs. 2^A and 2^B. Thereupon by the provision of suitable perforations to coact with the note ducts in playing sub-section No. 2, this particular part of the stop so temporarily connected may be played as long as desired from sub-section No. 2.

It will be noted that taken in the order of the scale, the part being played from sub-section No. 2 is part No. 1 of the stop, as indicated on the left of the range selector 1PPC in Figs. 1 and 1^B. In an entirely similar manner part No. 2 of the stop may be operatively associated with playing sub-section No. 2 by the simple actuation of section 8^s of switch-grouping selector PS' through duct 8^d (see Fig. 1^A) instead of actuating section 16^s from duct 16^{d'} as described. This connects part No. 2 of the stop through switch No. 2 of the 8' row of the range selector 1PPC. Similarly by actuating section 4^s of switch-grouping selector PS', section 3 of the stop may be connected through switch 2 of the row 4' with playing sub-section No. 2 of the tracker. For each of the switches 2 in each of the rows 16', 8', and 4', although they connect respectively with parts Nos. 1, 2 and 3 of the stop 1SD, are connected in multiple before the same playing sub-section No. 2 of the tracker. Upon the completion of the playing, another pair of ducts $o'$, $o^2$ are provided following the first pair as shown in Figs. 1 and 3^A, whereupon the locking circuit switch LD of that switch No. 2 which is actuated is again energized momentarily, this time to open the previously established locking circuit. Had the desired part been in the treble instead of the bass, the part selector switch $bs$ would have been opened through use of duct $dt'$ (Figs. 1^A and 3^A) instead of the reverse.

To take another example at random, part No. 3 of stop of pipes No. 5 may be played from sub-section No. 4 of the tracker. Part No. 3 is lower than sub-section No. 4 in pitch location. Control perforations are provided in the sheet to coact with playing sub-section No. 4 (which it will be seen by Fig. 3^A and Fig. 1^A is in section T¹). Preceding the note control perforations slightly, stop perforations $s'$ are provided coacting with the first of ducts $d^3$ associated with position No. 4. Another portion $s^2$ is provided to coact with duct $db'$, and a third $s^3$ to coact with duct $16^{d'}$, this effects an actuation of the magnet $m$ of section $tb$ of compass selector CS' (playing sub-section No. 4 being in the treble). Switch 16^s of switch grouping selector PS' is operated through duct $16^{d'}$, thus extending the actuating connection $cs$ connected with the particular one of ducts $d^4$ by way of the multiple connection $lst$ and by way of connection $pc$ emanating from the 16^s section of the switch grouping selector PS' to actuating magnet $a$ of switch 4 in the 16' row of the range selector 1PPC. Thus any other desired combination whatsoever may be effected according to our invention.

By enlarging the apparatus as shown in Fig. 8, using six or more rows 64', 32', 16', 8', etc., provision may be made to play from any desired tracker-bar playing sub-section any desired part whatsoever from the stop.

By the provision of the crossover switches $csw$ (see Figs. 2^A and 2^B), the connection of the actuating connections $cs$ and the note control connections N', N², N³, etc., may be interchanged, the ducts $d$ associated with unused actuating connections being utilized for making note connections and playing some parts of the music. Always as aforesaid all parts which are identically alike in notes and pitch may be controlled from the same sub-section. So also from the same position may be played all parts alike in notes and bearing an octave relation to each other throughout. So also treble and bass parts which are alike in the same or different stops of pipes may be controlled from the same sub-section. In such instances both treble and bass multiples $lst$ and $lsb$ are extended so that corresponding parts in the treble and bass are simultaneously connected with the desired playing sub-section. When the multiple connections N', N², N³, etc., connected with a given playing sub-section have an octave relation to each other, by the simultaneous actuation of switches 16^s, 8^s and 4^s, etc., or any part of them, all the octaves in any given part may be played from a given playing sub-section. Thus all the switches 1 of the range selector 1PPC may be simultaneously or plurally actuated, thus connecting in multiple to playing sub-section No. 1 parts 1, 2 and 3 or the first three octaves of the stop. With the enlargement of the apparatus which is contemplated, the invention admits of swells including octaves throughout the entire scale. In this case also by throwing a plural number of the sections 16^s, 8^s and 4^s of the switch grouping selector PS and extending only the multiples $lst$ or $lsb$, the playing of the octaves may be confined to the bass or the treble as may be desired. By variously combining the actuation of switches $ts$ and $bs$ and switches 16^s, 8^s and 4^s of the part selector CS and switch grouping selector PS, octave combinations limited in variety only by the limits of the entire stop range may be secured. And finally it may be said that according to our invention and with the apparatus full size, it is indeed possible to play multiple part music from a single tracker in which the total number of notes in parts is equal to the full number of ducts in the tracker, one hundred thirty-two or upward thereof, as may be secured on tracker of larger extent and through the use of the ducts of the upper row which control the various stop connections and circuits, switches csw being reversed.

In conclusion attention is again directed to Figs. 1A and 1B. Herein it will be noted that there are two range selectors, 1PPC and 2PPC, connected with a single stop of sounding devices 1SD. In the preceding description it is the upper one, 1PPC, which has been referred to. The lower one has its note bars connected with the sounding devices of the stop SD in the same pitch relation. But it is connected for operative association with section $T^4$ instead of section $T^3$ of the tracker bar. Sections $T^3$ and $T^4$ have each sixty-one note-control ducts. Each section we divide into six playing sub-sections. We have indicated three of the six of section $T^3$ and three of the six of section $T^4$. For each stop we provide the two range selectors, one 1PPC associable through conductors $N'$, $N^2$, etc., with section $T^3$, and the other 2PPC associable in an entirely similar manner with sections $T^4$ through conductors $M'$, $M^2$, etc., as indicated. The switch grouping selectors $PS^1$ and $PS^2$ and part selectors $CS^1$ and $CS^2$ are respectively permanently associated with the range selectors 1PPC and 2PPC as shown. Resultingly, any part of any stop is accessible from a multiple number (in Figs. 1A and 1B, three) of playing sub-sections in each of sections $T^3$ and $T^4$ of the tracker-bar. So also by reason of the provision of a pair each of part selectors CS and switch grouping selectors PS, selections of two parts in the same stop may be simultaneously made, one over control circuits cs of section $T'$ from which devices $CS^1$ and $PS^1$ are controlled and the other from section $T^2$ from which devices $CS^2$ and $PS^2$ are controlled. In this use of two devices PPC with each stop six ducts per stop instead of three are required for the control. Thus the increase in range of control from given size of tracker is accomplished through a decrease of the number of stops of pipes which may be controlled from the tracker.

Figure 1B:
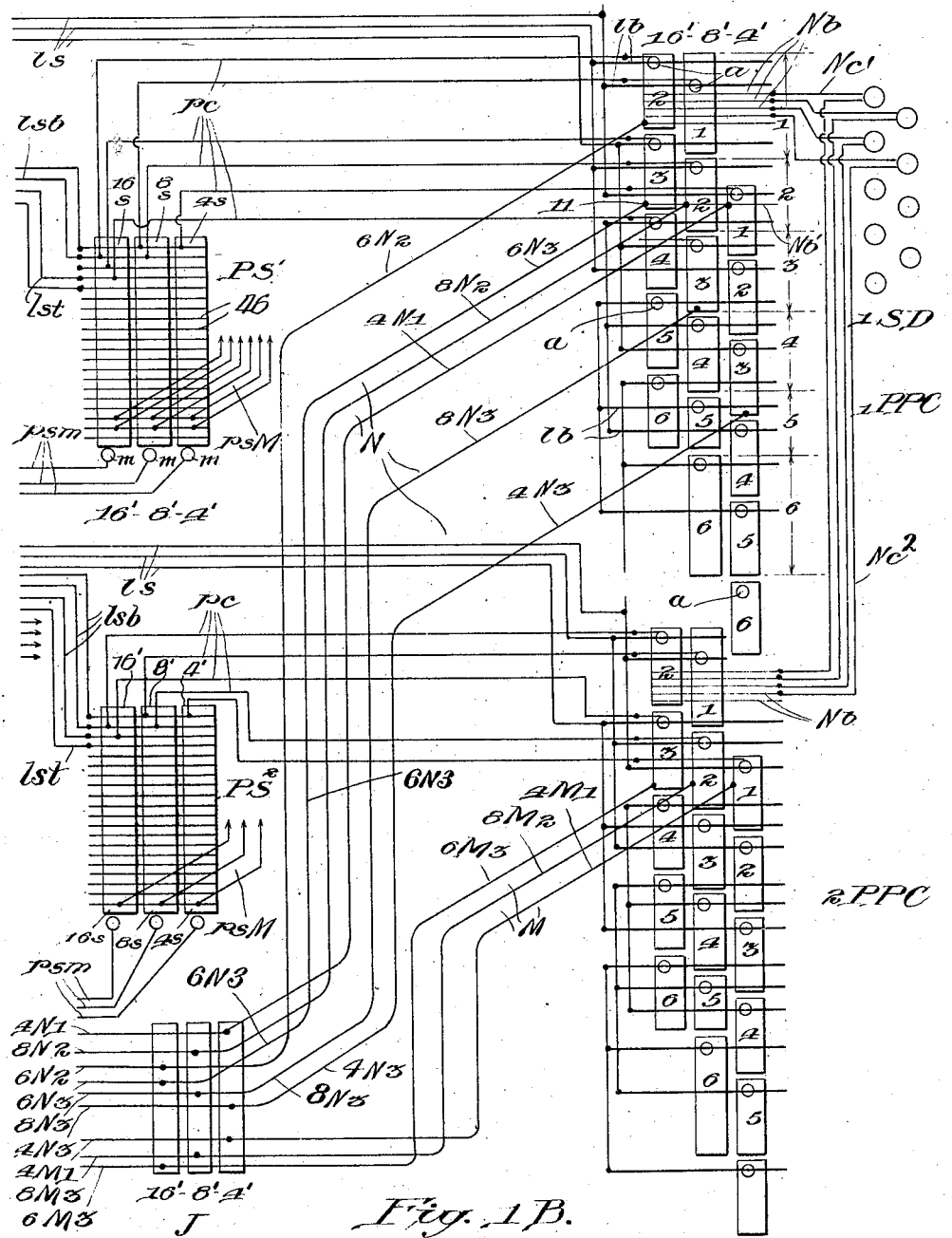

Referring to Fig. 2B, it will be seen that the circuits $Nc'$ and $Nc^2$ are not multiplied to a common winding of actuating magnet s, but that there are two separate windings on actuating magnet s, the one connected with note control circuits $Nc'$ of range selector 1PPC, and the other connected with note control connections $Nc^2$ of range selector 2PPC. The energization of either one of the windings on s is sufficient to actuate the control valve 23, and to all intents and purposes the single stop of sounding devices SD therefore serves the purpose of two stops of sounding devices, each of different character or pitch as the case may be from the other. Through this provision of two windings on the actuating magnets s, the expedient of providing a larger number of multiple connections and a larger number of rows to each range selector as shown in Fig. 8 is avoided. But either the apparatus of Fig. 8 or the apparatus shown in Figs. 1A and 1B just described may be used to carry out the purpose of our invention to its full extent. Further by the use of multiple range selectors and multiple connections from the distributing-terminal-boards it is possible to both duplicate the connections of 1PPC so that the stop can be played from two points of the tracker and therefore in different combinations with other stops simultaneously. Obviously both the apparatus of Fig. 8 and that of Figs. 1A and 1B is such as to permit further enlargement and expansion of the system to give further operating range to the instrument.

Figure 1C:
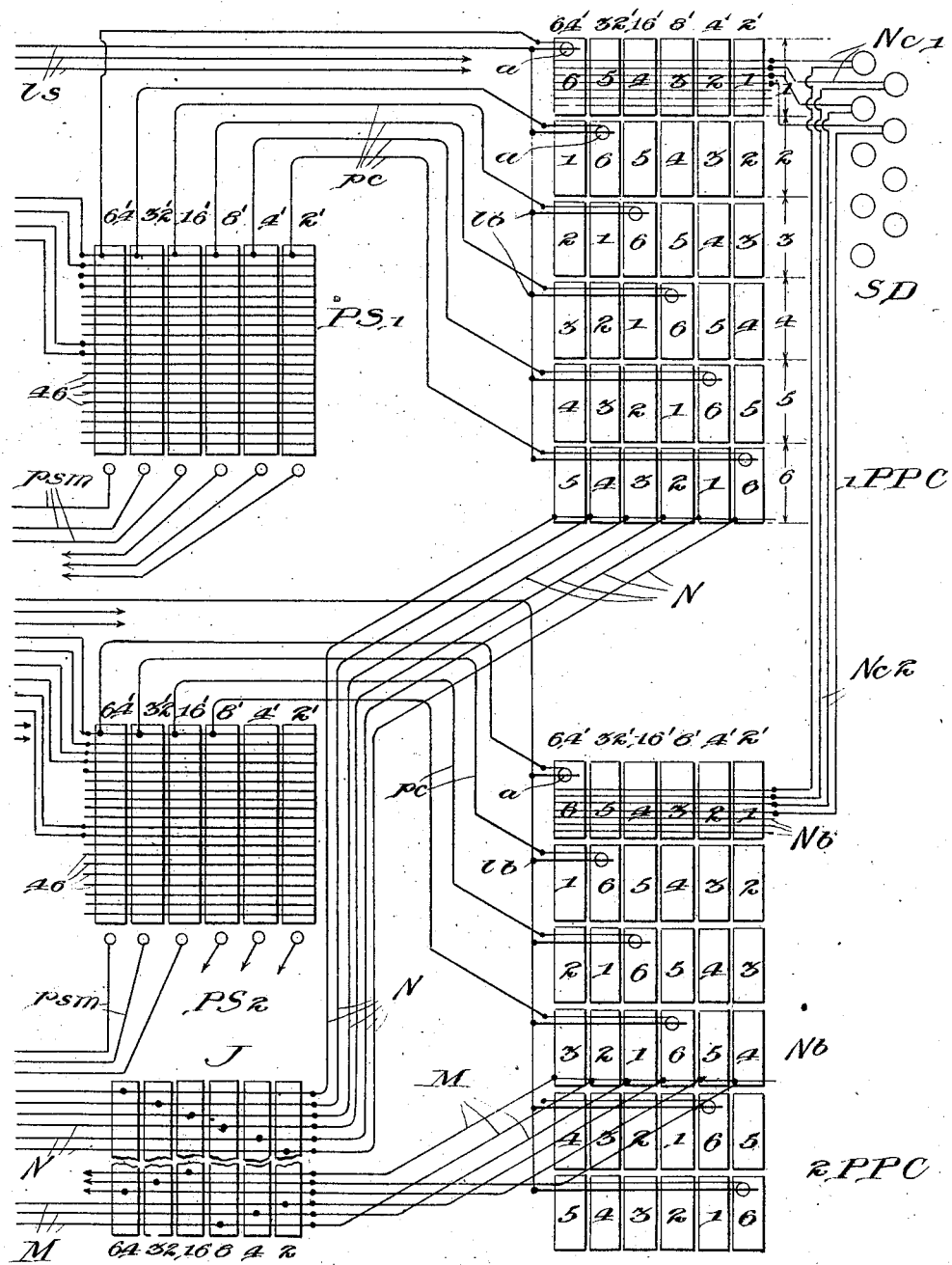

Fig. 1C shows a further enlargement of the system in accordance with the purpose of our invention, use being made of a range selector having six rows 64', 32', 16', 8', 4' and 2' as in Fig. 8. The diagram is made to tie onto Fig. 1A just as Fig. 1B, and the connections designated generally N and M are all made in the same manner through a distributing terminal board J. The board J and the switch grouping selectors $PS^1$ and $PS^2$ each have six sections 64', 32', etc., corresponding to the six rows of the devices 1PPC and 2PPC. There are required therefore six ducts for operating each $PS^1$ and $PS^2$, and the same number as before, four, for operating the part selectors $CS^1$ and $CS^2$, making sixteen and leaving thus one hundred and sixteen for the control of the individual switches 1, 2, 3, 4, etc. As in case of Fig. 1B, six are required for each stop, it thus being possible to play nineteen different parts at the same time. This number is only one half the number which may be played when only one device PPC is used, but it will be noted that with the apparatus of Fig. 1C, every part of every stop is accessible from any playing sub-section of either of sections $T^3$ and $T^4$. This is a very great advantage when playing complex music. And when it is remembered that the same parts played simultaneously on different stops are frequently the same or bear an octave relation to each other, and may be therefore controlled in parallel from the same playing sub-section, it will be apparent that the number of stops controlled may be increased to nearly forty as before.

If there be used only one device PPC of the six row type of Fig. 8 per stop, then there are required but three control ducts per stop as in the case of the three row type of Fig. 7, and with one hundred and sixteen ducts available (still allowing for a pair each of part and switch grouping selectors) there may be controlled from sections T' and T² thirty-nine stops or more. It will be observed that with this arrangement any part of any stop is accessible from any one of the six positions of the sections T³ or T⁴ with which it is associated. It is fully apparent that while the control of twice as many or more stops is had with this arrangement of one six-row device PPC per stop as may be had from the use of two devices PPC of three subdivisions each as in Fig. 1ᴮ, yet the range of accessibility (six playing sub-sections for each part) remains the same. With this arrangement we prefer to divide the stops suitably into two groups, one group accessible normally from sections T' and T³ and the other from sections T² and T⁴.

It is of course understood that some of the conductors N and M shown extend to pneumato-electrics of groups 4, 5 and 6 of sections T³ and T⁴, which groups space forbids us to show. Also it will be noted that the locking circuits $ls$ are each multiplied to the six switches of the same numerical designation.

Another arrangement of range selectors for obtaining the result obtained through the arrangement of Fig. 1ᶜ is shown in Fig. 1ᴰ. Two range selectors 1PPC and 2PPC are connected in parallel to the same conductors 4N¹, 4N², etc., and through them associated with the same section T³ of the trackerbar. The movable contacts of the switches of the base portion of range selector 2PPC are connected in parallel with those of the treble of range selector 1PPC and vice versa, the numerical designation being as shown. The note bars Nb of each range selector however are connected to the stop SD in the same order. Hence base parts are accessible through switches 1, 2 and 3 of device 1PPC which switches are accessible from any one of playing sub-sections 1, 2, 3, and treble parts through switches 1, 2 and 3 of device 2PPC, which latter switches are accessible from the same playing sub-sections. An entirely similar pair of devices 3PPC and 4PPC is associated with section T⁴ of the tracker. As shown the bars Nb of all four range selectors PPC are connected by multiples mP with the same stop SD. However the pair 1PPC, 2PPC may be used to control one stop and the pair 3PPC and 4PPC another, thus again doubling the number of stops controllable from a tracker of given dimensions. When devices PPC are paired as specified the parallel control circuits NC¹, NC² (of the modification of Fig. 2ᴮ) may be substituted for the multiple conductors $m$P.

If desired the number of pitch selectors PS, may be multiplied, as also may the number of distributing terminal boards J, each being assigned to a predetermined number of stops.

Referring to Fig. 2ᴬ, we have shown an additional contact 37' on pneumato-electric 34 controlling the circuit of an accessory actuator magnet Cy, used for actuating cymbals, triangles and the like. At the time of such actuation, the part selectors may be locked open through auxiliary locking circuit switches LDA connected in branches of the circuits $csm$, suitable control perforations being provided as before to coact with ducts $dt$ and $db$. It should be noted that the first duct $d$ of any group $d'$, $d^2$, etc., controls over circuits $cs$ switches 1 and 4, the second switches 2 and 5 and the third switches 3 and 6. If desired also in addition to the range selectors 1PPC and 2PPC, there may be provided a third range selector to which the multiple connections N', N², etc., may be made in different pitch relation, the switches themselves being of different dimensions and arrangement. Such a range selector would have its actuating connections governed over duplicate circuits $du$ (see Fig. 1ᴬ) extended through duplicate part and switch grouping selectors CS and PS in parallel with those CS', CS² and PS', PS² regularly provided. The third range selector would then be associated, with respect to any stop, as an auxiliary device, which by virtue of the arrangement and dimensions of its switches, when operated would establish different subsections, or different groups of connections to the subsections, on the tracker bar. This is very desirable in certain cases. Of course the circuits $du$ shown in Fig. 1ᴬ include duplicate circuits $psm$, $csm$ and $cs$ which operate through the provided duplicate part and switch grouping selectors (not shown).

We have not deemed it necessary to show the connections of the various circuits diagrammed in Figs. 1ᴬ and 1ᴮ to battery, these connections to a source of power being well understood and readily made by any one skilled in the art. In the several elemental circuits of Figs. 1ᴬ and 1ᴮ which are shown in full detail in Figs. 2ᴬ and 2ᴮ, these connections to battery are fully and clearly shown, also in Fig. 1. For all the remaining elemental circuits diagrammed in Figs. 1ᴬ and 1ᴮ and described as emanating therefrom, the connections are similar. The showing of such a multitude of battery connections in Figs. 1ᴬ and 1ᴮ would but complicate matters without increasing the clearness of the showing in any way.

We have herein described and claimed a preferred embodiment of our invention in detail. We reserve the full right to file division applications covering the several circuit closing devices and other elemental parts of the apparatus of our invention in detail. Thus the part selectors, switch grouping selectors, and range selectors, as well as the locking circuit switches and sounding devices are each to be separately protected by individual patent applications.

Obviously any person skilled in the art may devise many forms of apparatus embodying the spirit of our invention. Thus in this present application we have shown three forms of such apparatus, the one embodying the use of two range selectors 1PPC and 2PPC as shown in Figs. 1ᴬ and 1ᴮ, each individual to one of the sections T³, T⁴, for securing the six playing sub-section control, another the provision of a double range selector PPC as shown in Fig. 8, and Fig. 1ᶜ, together with an increased number of multiple connections with an increased number of rows of range selector switches for securing the twelve playing sub-section control, and still a third arrangement in Fig. 1ᴰ also giving a twelve sub-section control when used with four devices PPC to each stop, but six sub-section control when used with one pair of devices PPC to each stop. We have also described in detail how one three or one six sub-section control PPC may be used with each stop. Illustration of this is unnecessary since it consists simply in connecting each stop with one of the devices PPC instead of two. Obviously our invention may be carried out by other means, either electrically or pneumatically. The part and switch grouping selecting switches CS and PS may be made of many forms operating in detail in as many different ways to effect the selections and connections desired. There are already many forms of selector switches known to the art. The same is true of the locking circuit switches LD.

Having thus described our invention what we claim and desire to secure by Letters Patent is:

1. An orchestral musical instrument comprising a plurality of stops of sounding devices, each stop divided into a plurality of parts, a tracker bar, a range selector consisting of switching devices, note-control-connections extending in multiple between the tracker bar and said switching devices, means for actuating said switching devices, and connections from the tracker bar for energizing said means; whereby the said parts of stops may be connected interchangeably for operation from different positions on the tracker bar; and switching means extending between said energizing connections and said note-control-connections and when operated interchanging said connections with respect to the tracker bar.

2. An orchestral musical instrument comprising a plurality of stops of sounding devices and a tracker bar, a range selector for each stop comprising a plurality of switching devices arranged in groups having connections with said stop dividing it into separately operable parts, multiple note-control connections between the tracker bar and the said switches, each of said multiple note control connections connecting through a switching device associated with a part of the stop in a different register, means controlled through the tracker bar for at will actuating the switches associated with any desired set of multiples actuating connections therefor; and switches between said actuating connections on the one hand and said multiple note control connections on the other to interchange the connections of said actuating connections and said multiple note control connections to the tracker bar.

3. An orchestral musical instrument comprising a plurality of stops of sounding devices, and a common tracker bar; a plurality of normally inactive sets of note control connections extending in multiple from different sections of the tracker bar to each sounding device of each stop, each set being distributed to the sounding devices of its respective stop in a different register, and individual means for governing the connection of each individual set of multiples from the tracker bar to the sounding devices whereby the relation of the register of the sounding devices to different sections of the tracker bar may be varied automatically and at will.

4. An orchestral musical instrument comprising a plurality of stops of sounding devices, and a tracker bar, a plurality of normally inactive sets of note control connections extending in multiple between the tracker bar and the stops, a group of switches through which each set of connections is connected to its respective stop in a different pitch relation from the others, means for actuating said switches, together with actuating connections therefor governed from said tracker whereby any switch of any group or all the switches of any group may be energized to connect any part of a stop with any given part of said tracker.

5. An orchestral musical instrument comprising a plurality of stops of sounding devices, and a tracker bar, a plurality of sets of note control connections extending in multiple between said tracker and said stops, a group of switches connecting one set of multiple note control connections to a stop in different registers, a second group of switches connecting another set of the aforesaid multiples in other different registers to the same stop, means for actuating all of the switching devices, and sets of connections for actuating said actuating means extending in multiple to the actuating means of the respective groups of switches aforesaid.

6. An orchestral musical instrument comprising a plurality of stops and one tracker bar, a plurality of sets of note control connections extending in multiple between said tracker and said stops, a set of switching devices comprising a plurality of groups of switches, each group connecting a set of said multiples to a stop in a different register, means for actuating said switching devices, selective devices operable from the tracker bar to pick out and actuate a particular switching device, and comprising multiple control connections between related switches in the several groups together with separately actuated selective devices for picking out the particular multiple leading to any switching device, and an additional set of switching devices also associated with said stop, together with control connections and selective devices therefor in multiple with the actuating connections and the selective devices for the first named set.

7. An orchestral musical instrument comprising a plurality of stops of sounding devices, and one tracker bar, a plurality of sets of normally open note control connections controlled through the tracker and extending in multiple between said tracker and a stop, a set of switching devices comprising a plurality of groups of switches, each group adapted to connect one set of said multiples to said stop in a different register from the others, and means for actuating said switches together with actuating connections controlled from the tracker whereby a given part of said stop may be played from any desired part of said tracker.

8. An orchestral musical instrument comprising a stop of sounding devices, and one tracker bar, a plurality of sets of normally open note control connections controlled through the tracker and extending in multiple between said tracker bar and said stop, a set of switching devices comprising a plurality of groups of switches, each group adapted to connect one set of said multiples to said stop in a different register from the others, and means for actuating said switches together with actuating connections therefor operable from the tracker, whereby any given part of said stop may be played from any desired part of said tracker, and means whereby note control connections of a plurality of said multiple sets are simultaneously connected for operation from a given part of the tracker.

9. An orchestral musical instrument comprising a stop of sounding devices, and a tracker bar, a range selector comprising a plurality of groups of switching devices with a common group of note control terminals, note control connections between said terminals and the actuating means of the sounding devices of said stop, and individual sets of note control connections from the individual terminals of each switching device extending in multiple between said range selector and the tracker, means for energizing said connections from said tracker, together with means also energizable from said tracker for selectively determining the energization of any one of said switching devices.

10. An orchestral musical instrument comprising a stop and a tracker bar, a range selector for said stop comprising a plurality of groups of normally open switches having a set of common terminals to which connection may be made through the switches, individual note control connections between said common terminals and the sounding devices of the stop, sets of note control connections between the individual terminals of the groups of switches and the tracker in multiple with each other, means for controlling said multiple connections from the tracker and means for selectively actuating said switches of the range selector from the tracker.

11. An orchestral musical instrument comprising a stop and a tracker bar, a range selector comprising a plurality of groups of switches having a common set of terminals with which the groups of switches make connection in multiple, multiple note control connections extending through said switches between the tracker on the one hand and the sounding devices of said stop on the other, multiples connected with one group of said switches having a different pitch relation to the common terminals from those connecting with the other groups of said switches, means for energizing said multiple note control connections from the tracker, and means for actuating the switches of the groups controllable individually from the tracker.

12. An orchestral musical instrument comprising a stop and a tracker bar, a control device comprising a plurality of groups of switches, said groups of switches having a set of common terminals and individual terminals, note control connections from said common terminals to the sounding devices of said stop, note control connections extending from the individual terminals of the switches in several groups, those emanating from each group extending to different control points of said tracker whereby each sounding device is controllable from as many positions on the tracker as there are groups of switches, and means to selectively determine from the tracker the actuation of any desired switch of any group.

13. An orchestral musical instrument comprising a plurality of stops and a tracker bar, a range selector comprising a plurality of groups of switches connected in multiple to the sounding devices of each stop, the switches of the group adapted for separate actuation and bearing an overlapping relation to each other longitudinally of the scale of the stop, multiple note-control connections between the tracker and the switches adapted to be extended by and through the switches to the sounding devices, and means for actuating the switches selectively controlled from the tracker to determine the particular switch or switches through which in any given case connection is thereby extended from the tracker to the sounding devices.

14. An orchestral musical instrument comprising a plurality of stops of sounding devices and a tracker bar, a plurality of groups of switches having a common set of terminals, individual terminals for each switch, the individual switches of the groups overlapping each other in the scale and each adapted to control connection with a part of said common terminals through its individual terminals, note control connections in multiple between said common terminals and the sounding devices, together with sets of primary note control connections between the tracker and the individual terminals of the switches, each set of connections connected with the switches in a different pitch relation, and means operable from the tracker to selectively determine the actuation of any individual switch.

15. An orchestral musical instrument comprising a plurality of stops of sounding devices and a tracker bar, and a range selector intermediate the tracker and each stop, said range selector comprising a plurality of groups of switching devices, said groups having a set of common terminals and each switch a set of individual terminals, note control connections between said common terminals and said sounding devices, multiple note control connections between said switching devices and tracker connected to individual terminals of the switching devices, said multiple connections to each group controlling sounding devices bearing an octave relation, means for energizing said multiple connections from the tracker, and means also controllable from the tracker for selectively determining the actuation of the switching devices.

16. An orchestral musical instrument comprising a plurality of stops of sounding devices and a tracker bar, range selectors between the stops and tracker, each comprising a plurality of groups of switches connected in multiple relation to the sounding devices of a stop and said tracker whereby certain sounding devices may be operated from the tracker through any chosen group of switches, means and connections for actuating the individual switches of the groups connected in multiple from common control points, together with selective means controllable from the tracker and governing said actuating connections whereby the actuation of any individual one of the plurality of actuating means controlled from one of the said common points may be determined.

17. An orchestral musical instrument comprising a plurality of stops of sounding devices and a tracker bar; range selectors between the stops and tracker, each comprising a plurality of groups of switches; multiple note control connections between the tracker and the sounding devices arranged in sets each one of which includes a group of said switches, individual means for actuating each switch, connections over which said individual actuating means are interchangeably energized from a single control point on the tracker bar, said connections extending in multiple to the actuating means of switches related to both the treble and bass portions of the stop, and a selector switch operated from the tracker and governing said energizing connections for selectively determining the extension of said connections to the treble or bass portions.

18. An orchestral musical instrument comprising a plurality of stops of sounding devices and one tracker bar, range selectors between the stops and tracker, comprising a plurality of groups of switches, multiple note control connections between the tracker and the sounding devices arranged in sets each one of which includes a group of said switches, individual means for actuating each switch, multiple actuating connections from common control points in the tracker extending alike to the actuating means of the switches of different groups in the treble and bass portions of the stop, a part selector controlling the extension of said connections from the common point and separating the same into treble and bass divisions, together with a switch grouping selector controlling the extension of said connections and dividing the same according to the group of switches to which they pertain and with means for actuating said selector switches from the tracker.

19. An orchestral musical instrument comprising a plurality of stops of sounding devices and a tracker bar, a range selector between the stops and tracker comprising a plurality of groups of switches, multiple note control connections between the tracker and the sounding devices arranged in sets each one of which sets includes a group of said switches, means for actuating the switches, multiple actuating connections over which a plurality of said actuating means are controlled from common control points, a part selector comprising a switching means governing said connections and operable in sections which segregate said actuating connections into groups each extending to the actuating means of the switches controlling the treble and bass of the stop respectively, and means for separately actuating from the tracker said sections of the part selector.

20. An orchestral musical instrument comprising a plurality of stops of sounding devices and a tracker bar, range selectors between the stops and tracker, comprising a plurality of groups of switches, multiple note control connections between the tracker and the sounding devices arranged in sets each one of which includes a group of said switches and sounding devices in different registers, individual means for actuating the switches, multiple actuating connections through which the actuation of a plurality of said switches may be controlled from a common point, said multiple connections extending alike to actuating means of said switches in each of the several groups, and a switch-grouping selector comprising a switching device having a plurality of separately operating sections corresponding in number to the number of groups of said switches, and adapted to segregate said multiple connections to the actuating means according to their switch-group connections, together with means for individually actuating the sections of said switch-grouping selector to extend the said multiple connections of the switches of any desired group.

21. An orchestral musical instrument comprising a plurality of stops of sounding devices and a tracker bar, a range selector between the stops and tracker, multiple note control connections between the tracker and the sounding devices arranged in sets each one of which includes a group of said switches and sounding devices in different registers, individual means for actuating each switch, multiple actuating connections over which a plurality of said switches may be controlled from a common point, part selector switches comprising two separately operating sections the one controlling the extension of actuating connections of the treble part and the other the same connections with the bass part, a switch-grouping selector controlling the same multiple connections and comprising a set of separately actuable sections equal in number to the number of groups of switches, each section controlling the extension of the actuating connections individual to a different group of switches, and means whereby the several sections of said switch-grouping selector may be individually actuated from the tracker 22. An orchestral musical instrument comprising a plurality of stops of sounding devices and a tracker bar, range selectors between the stops and tracker comprising a plurality of groups of switches, multiple note control connections between the tracker and the sounding devices arranged in sets each one of which includes a group of said switches and sounding devices in different registers, individual means for actuating each switch, a common actuating connection for a plurality of said actuating means, some of said switches being associated with the treble part and others with the bass part, and a part selector through which said common control connection is divided into separately energizable groups one to the treble and one to the bass switch actuating means respectively, and means for actuating said selector controllable from the tracker to effect the extension of said common connection over one or the other of said groups at will.

23. An orchestral musical instrument comprising a plurality of stops of sounding devices and a tracker bar, a range selector between the stops and tracker comprising a plurality of groups of switches, multiple note control connections between the tracker and the sounding devices arranged in sets each one of which includes a group of said switches and sounding devices in different registers, individual means for actuating each of said switches, an actuating connection controllable from the tracker and common to a plurality of the actuating means belonging to switches in different groups, and a switch-grouping selector through which said common actuating connection is multiplied to the different actuating means of respective switches in different groups, together with means for actuating said switch-grouping selector controllable from the tracker to actuate the switch-grouping selector to extend the said common connection through any desired multiple to switches of any desired group.

24. An orchestral musical instrument comprising a plurality of stops and a tracker bar, divided into playing sub-sections, multiple note control connections between the tracker and the sounding devices of each of said stops whereby a stop may be operated over any one of a plurality of sets of connections, a group of switches in each set of said multiple note control connections through each of which connection is made from the tracker to the sounding devices of the stop in different registers, there being an individual switch in each group connected with multiples leading from each playing sub-section of the tracker, actuating means individual to each of said switches, an actuating connection with the tracker common to the actuating means of all of the switches operatively associated with a sub-section of the tracker as aforesaid, and a switch-grouping selector dividing said common actuating connection to effect individual connection with one or more of said switches.

25. An orchestral musical instrument comprising a plurality of stops of sounding devices and a tracker bar, range selectors between the stops and tracker comprising a plurality of groups of switches, multiple note-control connections between the tracker and the sounding devices arranged in sets each one of which includes a group of said switches in different pitch relation, actuating means individual to each switch, multiple actuating connections from common points governed from the tracker, a part selector controlling the extension of said connections and comprising two normally closed switches, the one extending a portion of the actuating connections to the bass part of the range selector and the other extending another portion of the connections to the treble part, and means for opening said switches of the part selector individually.

26. An orchestral musical instrument comprising a plurality of stops of sounding devices and a tracker bar, range selectors between the stops and tracker comprising a plurality of groups of switches, multiple note control connections between the tracker and the sounding devices arranged in sets each one of which includes a group of said switches in different pitch relation, means individual to each switch for actuating the same, multiple connections to said actuating means from common points governed from the tracker, a part selector controlling the extension of said actuating connections and comprising two normally closed switches, the one extending connections to the bass part and the other connections to the treble part, means for at will individually shifting said switches of the part selector to open position, a switch grouping selector controlling said connections and comprising switches equal in number to the number of groups of switches of a range selector, each of said switches being normally open, together with means operated from the tracker for at will closing any one of said switches, each of said switches of the switch grouping selector governing actuating connection of one group of switches of the range selector only.

27. An orchestral musical instrument comprising a plurality of stops of sounding devices, and a tracker bar, multiple note control connections between the tracker and the stops including a plurality of groups of self-locking electromagnetic switches through which said connections extend and which switches divide the said connections into sets of multiples each leading to a portion of a different register on the tracker, operating connections between the tracker and the actuating electromagnets of the switches, together with locking-circuit control means electrically connected with each actuating circuit.

28. An orchestral musical instrument comprising a plurality of stops of sounding devices, and a tracker bar, multiple note control connections between the tracker and a stop including a plurality of groups of self-locking electromagnetic switches through which said connections extend and which switches divide the said connections into sets of multiples each set leading to a portion of a different register on the tracker, actuating circuit connections between the tracker and the actuating electromagnets of the switches, together with a locking circuit for each switch, and means for disabling said locking circuits at will.

29. An orchestral musical instrument comprising a plurality of stops of sounding devices, and a tracker bar, multiple note control connections between the tracker and a stop including a plurality of groups of electromagnetic switches through which said connections extend and which switches divide the said connections into sets of multiples each set leading to a portion of a different register on the tracker, actuating connections between the tracker and actuating means individual to each switch, a locking circuit connection for each switch, and a control device for said locking circuit operated from the tracker and which upon energization alternately renders operative and disables said locking circuit connection.

30. An orchestral musical instrument comprising a plurality of stops of sounding devices, and a tracker bar, multiple note control connections between the tracker and a stop including a plurality of groups of self-locking switches through which said connections extend and which switches divide the said connections into sets of multiples each set leading to a portion of a different register on the tracker, actuating connections between the tracker and the actuating electromagnets of the switches, a locking circuit switch for each switch for rendering operative the locking circuit of said switch operatively associated with each of said actuating connections and energized therethrough, said locking-circuit switch being adapted to effect the rendering operative and disabling of the locking circuit of the associated switch on alternate energizations.

31. An orchestral musical instrument comprising a plurality of stops of sounding devices, and a tracker bar, multiple note control connections between the tracker and a stop including a plurality of groups of self locking electromagnetic switches through which said connections extend and which switches divide the said connections into sets of multiples each set leading to a portion of a different register on the tracker, actuating connections between the tracker and the actuating electromagnets of the switches, part selectors adapted to be momentarily energized and switch grouping selectors governing said connections and acting respectively to segregate said actuating circuits, the one into treble and bass divisions and the other into subdivisions according to the group of switches to which they pertain, and a locking circuit switch common to the corresponding self-locking switches in the different groups operable from said actuating connection and controlling the locking circuit of the self-locking switches upon alternate energizations to render operative and disable said locking circuit.

32. An orchestral musical instrument comprising a plurality of stops of sounding devices, and a tracker bar, mutiple note control connections between the tracker and a stop including a plurality of groups of self-locking electromagnetic switches through which said connections extend and which switches divide the said connections into sets of multiples each set leading to a portion of a different register on the tracker, actuating connections between the tracker and the electromagnets of the switches, part selectors and switch grouping selectors governing said connections and acting respectively to segregate said connections, the one into treble and bass divisions, and the other into subdivisions according to the group of switches to which they pertain, and a locking circuit switch controlling each a locking connection common to switches of the several groups connected with a determinate position on the tracker.

33. An orchestral musical instrument comprising a plurality of stops of sounding devices, and a tracker bar, multiple note control connections between the tracker and a stop including a plurality of groups of switches through which said connections extend and which switches divide the said connections into sets of multiples each set leading to a position of a different register on the tracker, actuating connections between the tracker and actuating electromagnets individual to each switch, together with locking circuit connections associated with each actuating connection whereby an actuated switch of any group will retain itself in actuated position as long as desired, part selectors and switch grouping selectors governing said connections and acting respectively to segregate said circuits, the one into treble and bass divisions, and the other into subdivisions according to the group of switches to which they pertain, and locking circuit switches governing each a locking circuit having multiple branches to a plurality of said actuating magnets.

34. An orchestral musical instrument comprising a plurality of stops of sounding devices, and a tracker bar, multiple note control connections between the tracker and a stop including a plurality of groups of switches through which said connections extend and which switches divide the said connections into sets of multiples each set leading to a portion of a different register on the tracker, actuating connections between the tracker and actuating magnets for each switch, together with locking circuit connections associated with each actuating connection whereby an actuated switch of any group will retain itself in actuated position as long as desired, part selectors and switch grouping selectors governing said connections and acting respectively to segregate said circuits, the one into treble and bass divisions and the other into subdivisions according to the group of switches to which they pertain, and locking circuit switches jointly controlling locking circuits of and connections to a plurality of said actuating magnets.

35. An orchestral musical instrument comprising a plurality of stops of sounding devices and a tracker bar, multiple note control connections between the tracker and a stop including a plurality of groups of electromagnetic switches through which said connections extend and which switches divide the said connections into sets of multiples each set leading to a portion of a different register on the tracker, actuating connections between the tracker and actuating electromagnets individual to each switch, together with self locking circuit connections controlled by each switch and connected with each actuating circuit whereby an actuated switch of any group will retain itself in actuated position as long as desired, part selectors and switch grouping selectors governing said actuating connections and acting respectively to segregate said circuits, the one into treble and bass divisions, and the other into subdivisions according to the group of switches to which they pertain, and locking circuit switches jointly controlling the locking circuits of the actuating electromagnets of the switches and connections from the switch grouping selector to the actuating means, said locking circuit switches comprising connection-controlling means adapted to break the connections from the switch grouping selector to any actuating electromagnet immediately after the locking circuit of said actuating electromagnet has been closed and vice versa.

36. An orchestral musical instrument comprising a plurality of stops of sounding devices, and a tracker bar, multiple note control connections between the tracker and a stop including a plurality of groups of electromagnetic switches through which said connections extend and which switches divide the said connections into sets of multiples each set leading to a portion of a different register on the tracker, actuating connections between the tracker and actuating electromagnets individual to each switch, part selectors and switch grouping selectors governing said connections and acting respectively to segregate said circuits, the one into treble and bass divisions, and the other into subdivisions according to the group of switches to which they pertain, and locking circuit connections for said actuating electromagnets derived from said multiple connections between the part selector and the switch grouping selector, each locking connection being common to all the actuating electromagnets of the several groups of switches appertaining to a determinate position on the tracker.

37. An orchestral musical instrument comprising a plurality of stops of sounding devices and a tracker bar, multiple note control connections between the tracker and the sounding devices of each stop including in each case a range-selector comprising a plurality of groups of switching devices through which connection is made between the associated stop and positions of different register on the tracker, a second range selector associated with one of said stops and through which the note control connections are multipled between the tracker and sounding devices but from positions on the tracker in different registers from those made through the first named range selector, together with means for selectively determining the actuation of the various switching devices.

38. An orchestral musical instrument comprising a plurality of stops of sounding devices and one tracker bar, multiple note control connections between the tracker and the sounding devices of each stop including in each case a range selector comprising a plurality of groups of switching devices through which connection is made between a stop and the tracker in different registers on the tracker, a second range selector associated with one of said stops, through which the connections are multipled between the tracker and sounding devices to different positions on the tracker from those made through the first named range selector, means for operating the individual switches of the respective range selectors, and multiple actuating connections to said means from common control points on said tracker, together with means associated with the multiple connections of the operating means of each range selector for separately and selectively determining the actuation of any given switching device of either range selector.

39. An orchestral musical instrument comprising a plurality of stops of sounding devices, and a tracker bar, a plurality of sets of multiple note control connections between the tracker and the stops which connections extend to a common distributing-terminal board, multiples from these connections extending from the terminal board to each stop of sounding devices and including in each case range selectors comprising a plurality of groups of switches through each of which connections may be made from the tracker to the stop in different ranges of the scale, means for actuating the individual switches of all the range selectors of all the stops, together with means controllable from the tracker to selectively determine the actuation of any switch of any particular stop.

40. An orchestral musical instrument comprising a plurality of stops of sounding devices, and a tracker bar, a plurality of sets of multiple note control connections between the tracker and the stops which connections extend to a common distributing terminal board, multiples from these connections extending from the terminal board to each stop of sounding devices and including in each case a range selector comprising a plurality of groups of switches through each of which connections may be made from the tracker to the associated stop in different ranges of the scale, means for operating each individual switch of each range selector, operating connections therefor, means segregating for exclusive energization, the operating connections pertaining to any range selector of any stop, and additional means governed from the tracker for determining the operation of any switch of any range selector of any stop.

In testimony whereof we affix our signatures in presence of two witnesses.

MYRON C. BEMAN.
FRANK A. PILCHER.

Witnesses:
G. RAYMOND DEYO,
M. PAULINE SCOTT.